Jan. 24, 1939.   H. E. TWOMLEY   2,144,821
SHOOK SELECTOR FOR BOX-MAKING MACHINES
Filed Nov. 9, 1936   13 Sheets-Sheet 1

INVENTOR.
Herbert E. Twomley
BY Lyon & Lyon
ATTORNEYS

Jan. 24, 1939.  H. E. TWOMLEY  2,144,821
SHOOK SELECTOR FOR BOX-MAKING MACHINES
Filed Nov. 9, 1936  13 Sheets-Sheet 2

INVENTOR.
Herbert E. Twomley
BY Lyon & Lyon
ATTORNEYS

INVENTOR.
Herbert E. Twomley
BY Lyon & Lyon
ATTORNEYS

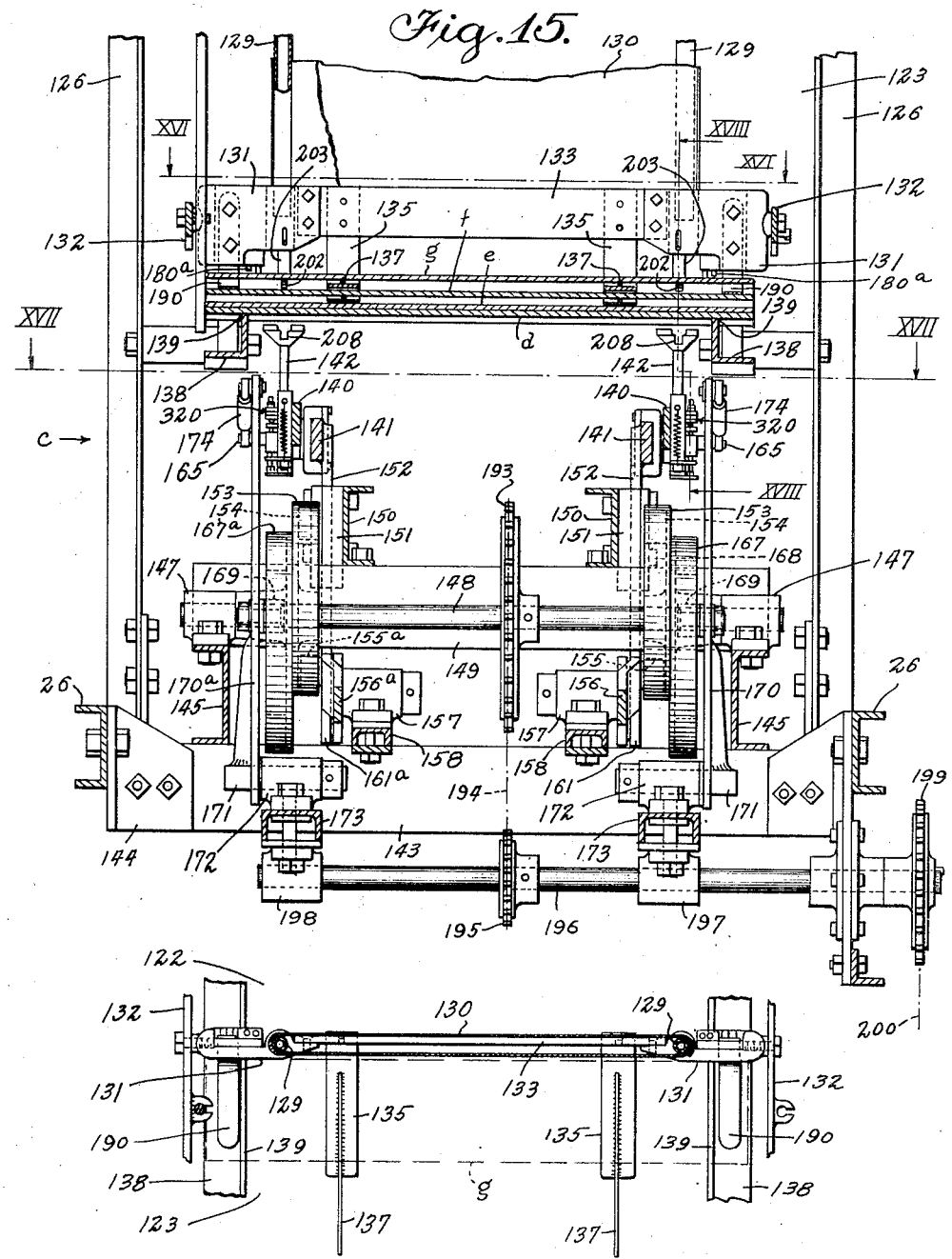

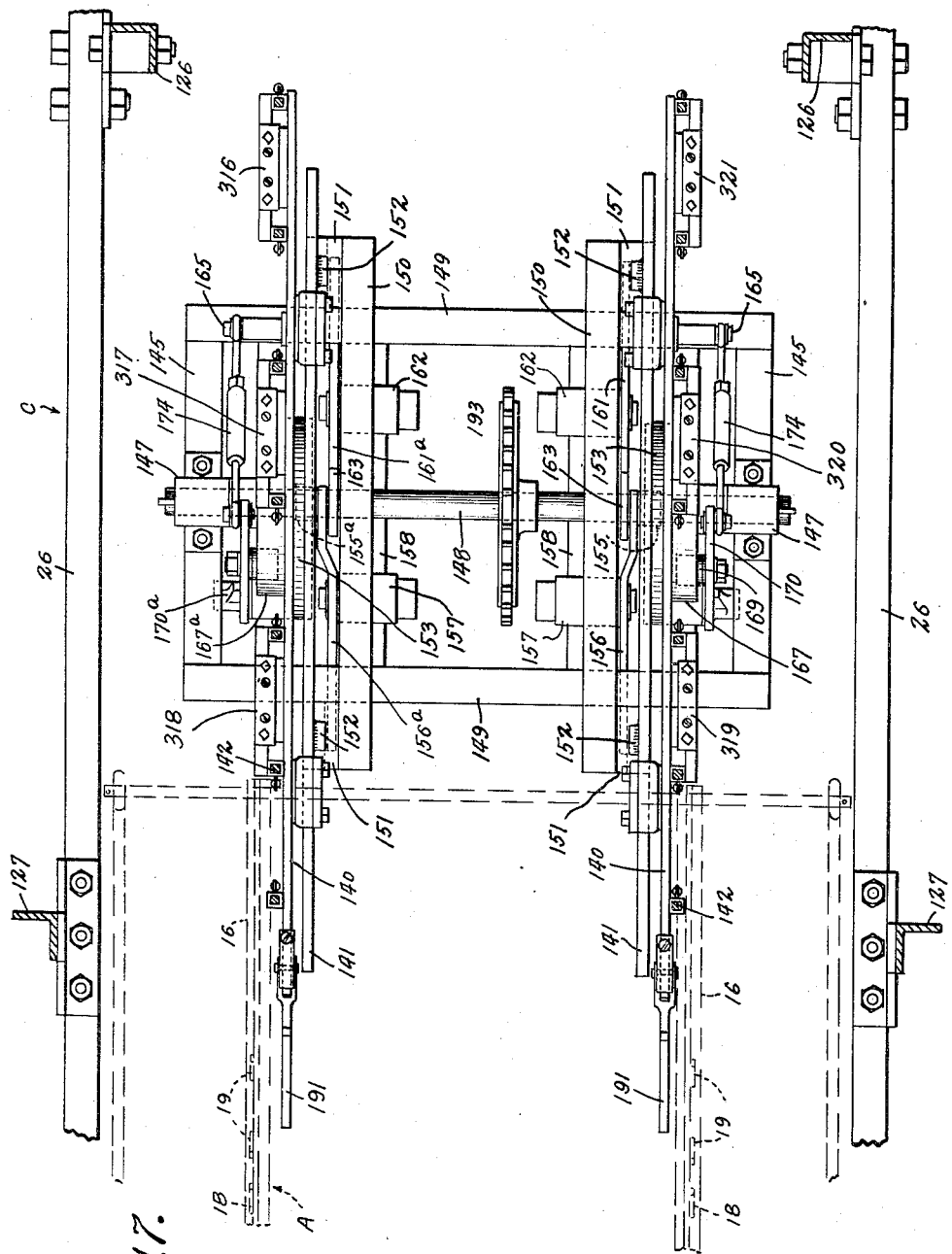

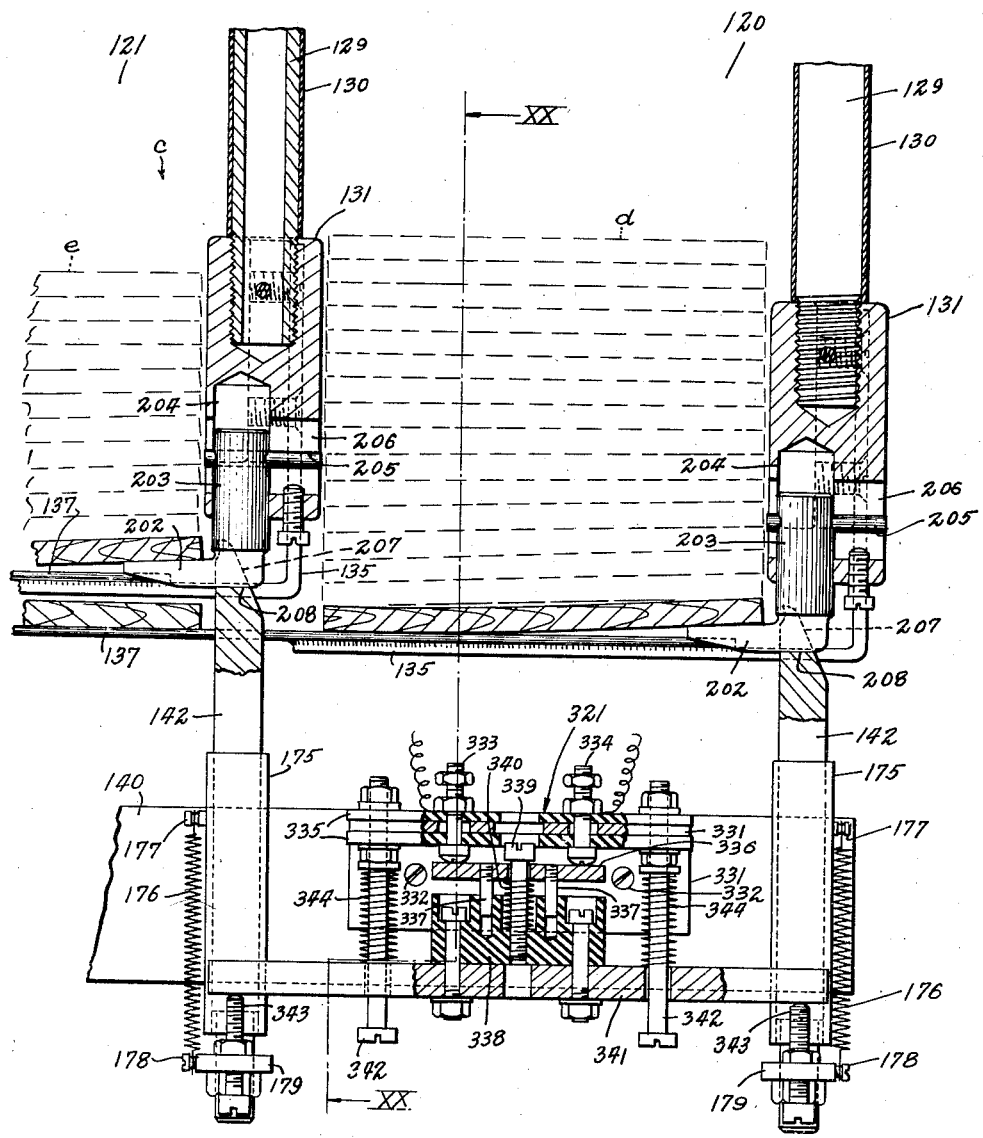

Jan. 24, 1939.   H. E. TWOMLEY   2,144,821
SHOOK SELECTOR FOR BOX-MAKING MACHINES
Filed Nov. 9, 1936   13 Sheets-Sheet 11

INVENTOR.
Herbert E. Twomley
BY Lyon & Lyon
ATTORNEYS

Jan. 24, 1939.   H. E. TWOMLEY   2,144,821
SHOOK SELECTOR FOR BOX-MAKING MACHINES
Filed Nov. 9, 1936   13 Sheets-Sheet 12
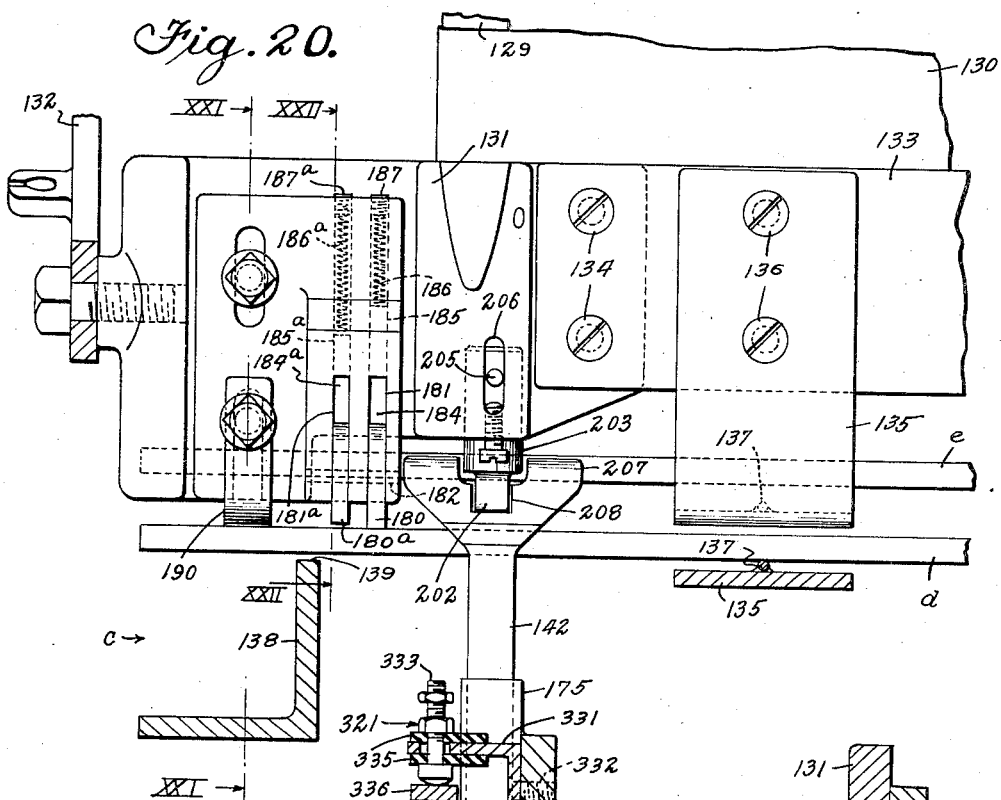
Fig. 20.
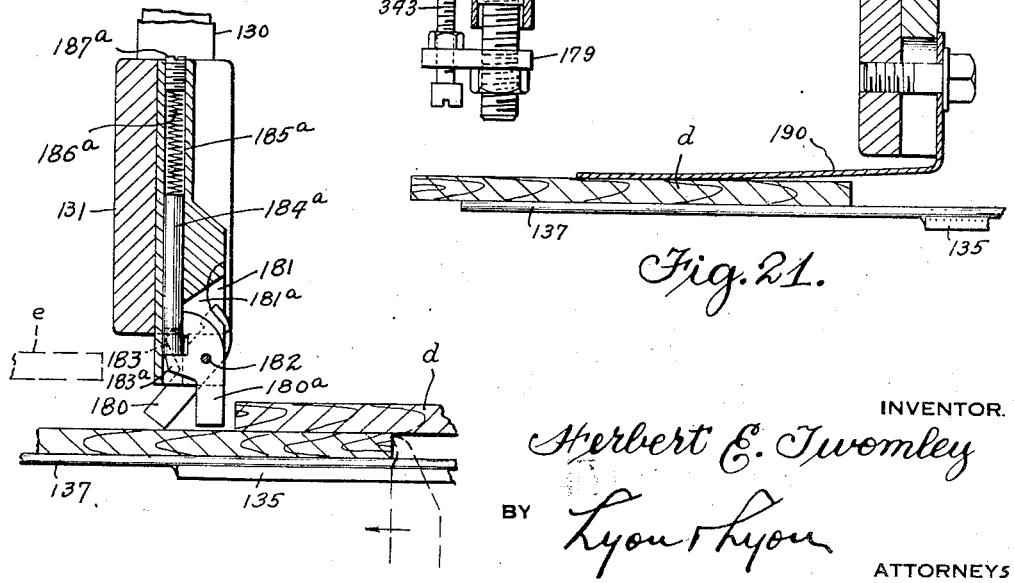
Fig. 22.
Fig. 21.
INVENTOR.
Herbert E. Twomley
BY Lyon & Lyon
ATTORNEYS Jan. 24, 1939.    H. E. TWOMLEY    2,144,821
SHOOK SELECTOR FOR BOX-MAKING MACHINES
Filed Nov. 9, 1936    13 Sheets-Sheet 13

INVENTOR.
Herbert E. Twomley
BY Lyon & Lyon
ATTORNEYS

Patented Jan. 24, 1939

2,144,821

UNITED STATES PATENT OFFICE 2,144,821

SHOOK SELECTOR FOR BOX-MAKING MACHINES

Herbert E. Twomley, Riverside, Calif., assignor to Food Machinery Corporation, San Jose, Calif., a corporation of Delaware Application November 9, 1936, Serial No. 109,920

26 Claims. (Cl. 1—14)

My invention relates to a shook selector for box-making machines, and relates particularly to a machine which may be associated with or constitute an attachment for a box-making or box-lidding machine for the purpose of properly feeding the box or lidding parts to the machine as the machine performs the nailing functions necessary to make or lid the box or crate.

In the packing industry, particularly in the packing of fruits, vegetables and similar commodities, it is the common practice to employ wooden boxes which are constructed ordinarily from "heads" or relatively heavy end boards constituting the ends or partitions of the box, to which are secured relatively thin strips of wood constituting the sides, bottom and top of the box. In instances where the dimensions of the box are such that the width of the bottom of the box differs from the width of the sides of the box, it is necessary to employ bottom boards which differ from the boards which are used upon the side of the box and in certain instances it may be desired to employ side boards which are previously stamped or branded with certain trade names, trade information, or other printed matter so that in feeding the box parts into the machine the boards must be fed in a predetermined sequence; for example, in the manufacture of boxes or crates for the packing and shipping of oranges it is the common practice to construct the box of three heads, one at each end of the box, and one in the center of the box constituting a central partition dividing the box into two sections or compartments. The bottoms of such boxes or crates are formed of two relatively thin and relatively narrow boards or "shook", and the sides of the box are also formed of two relatively thin and relatively narrow shook, the uppermost of which on each side carries branded thereon the trade name, trade mark or brand name of the company or association packing the fruit. The actual manufacture of these boxes is usually performed by a box-making machine in which the box parts are automatically fed into the machine and nailed together to make a complete box during a cycle of operations of the machine, the various box parts being fed into the operating portion of the machine from suitable hoppers wherein the box parts are stacked. Heretofore it has been the common practice to arrange the shook in every hopper in groups of six, including two side boards for one side of the box, two boards for the bottom of the box, and two side boards for the other side of the box, the lowermost board of the group having the brand name printed or branded thereon and the uppermost board also having the brand name imprinted thereon but arranged in the group with the printed matter upside down with respect to the printed matter on the first board of the group. It was necessary, therefore, for a man to specifically arrange the boards before they were put into the hopper of the machine which required the consumption of a relatively great amount of time, and since the avialable space on the machine for the reception of such grouped boards was limited, it was either necessary to provide a man for the box-making operation, and another man for the arranging of the boards and the placing of the boards into the hopper as they were withdrawn therefrom, or the operator of the machine had to stop the machine and arrange the boards and fill up the hoppers after each few operations of the machine.

It has heretofore been suggested that the shook or boards employed as the side boards of boxes of this character could be drawn from the stacks, placed upon a conveyer belt in predetermined sequence, and fed toward the box-making machine, such devices however requiring a relatively great length of travel and consuming a relatively large area in the factory in which the boxes are manufactured.

It is an object of my invention to provide a shook selecting mechanism which will automatically draw boards from a series of stacks in a predetermined sequence, arranging these boards one upon the other and feeding the same toward the box-making machine ready to be used therein.

Another object of the invention is to provide a shook selecting device of the character set forth in the preceding paragraph, which is relatively compact and occupies a relatively small space at the rear of the box-making machine.

Another object of the invention is to provide a shook selecting device which may be formed as an attachment for a box-making machine and which is adapted to feed both the box heads and the side and bottom boards for the box into said machine.

Another object of the invention is to provide a shook selecting device of the character set forth wherein heads are drawn from the stack and are fed directly into the box-making machine in timed relation with the operation of the box-making machine, and wherein the driving mechanism for the shook selector is actuated by the driving mechanism of the box-making machine.

Another object of the invention is to provide a shook selecting mechanism of the character set forth in the preceding paragraph wherein failure of the shook selecting mechanism to properly select the shook or to feed them into desired relation with the box-making machine will result in the stopping of the box-making machine until appropriate adjustment is made.

Another object of the invention is to provide a selecting mechanism for selecting and feeding a plurality of heads into a box-making machine, wherein a plurality of stacks of heads are arranged to be drawn from in sequence and the plurality of heads then passed into the box-making machine simultaneously.

Another object of the invention is to provide a shook selecting mechanism for selecting a plurality of shooks from a series of stacks in a predetermined order wherein a carriage is moved beneath the stacks in a rectangular path of travel to simultaneously draw one shook from each of the stacks and to move each of the shook drawn to a position below the next adjacent stack.

Other objects and advantages will be apparent from a study of the following specifications, read in connection with the accompanying drawings, wherein—

Fig. 15 is a vertical sectional view through the side and bottom shook selecting mechanisms, taken along line XV—XV of Fig. 1;

Fig. 16 is a detail horizontal sectional view taken along line XVI—XVI of Fig. 15;

Fig. 17 is a horizontal sectional view taken along line XVII—XVII of Fig. 15.

Fig. 18 is an enlarged vertical section of a pair of shook selecting fingers, illustrating the manner in which these fingers select the lowermost shook from each of their associated stacks and also illustrating the control mechanism by which the machine is stopped in the event of failure of the machine to properly select the shook;

Fig. 20 is an enlarged vertical detail sectional view taken along line XX—XX of Fig. 18;

Fig. 21 is a detail vertical sectional view taken along line XXI—XXI of Fig. 20;

Fig. 22 is a detail vertical sectional view of a shook holding finger taken along line XXII—XXII of Fig. 20;

Figures 1, 2, 3:
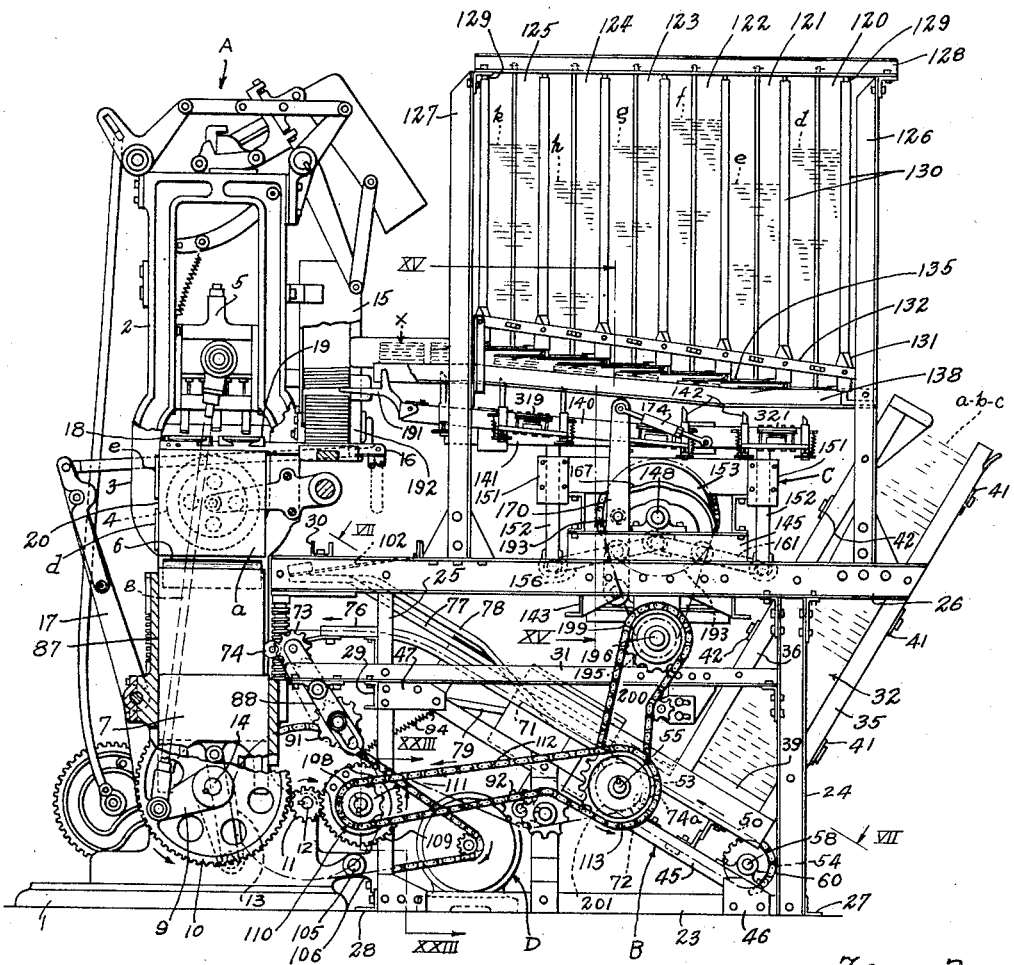
Fig. 1 is a side elevational view of a box-making machine with my shook selector attached thereto.
Fig. 2 is a perspective view of an orange box representing a typical box which may be made by the box-making machine shown in Fig. 1, and for which the shook and heads are selected by my shook selector.
Fig. 3 is a diagrammatic view of the side and bottom shook employed in the construction of the box shown in Fig. 2, and illustrating the order in which said shook must be selected by the shook selector in order to properly arrange them for the manufacture of the box shown in Fig. 2.
Figure 23:
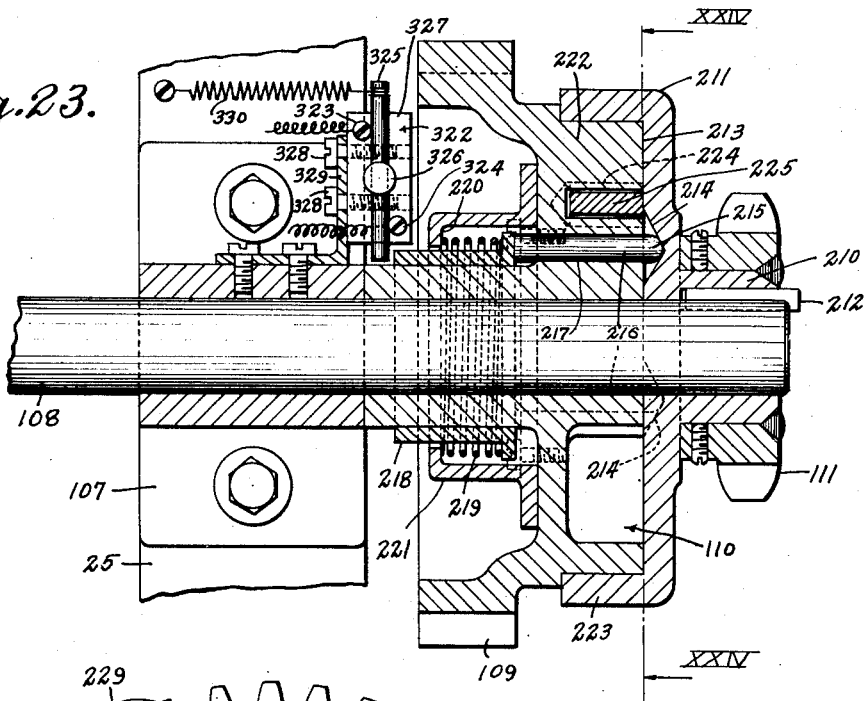
Figure 24:
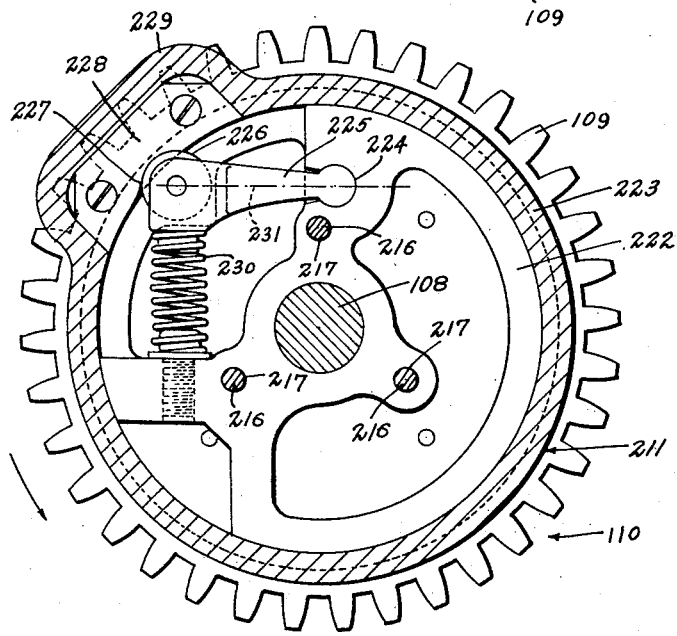

Fig. 23 is a vertical sectional view taken along the line XXIII—XXIII of Fig. 1, and illustrates in detail a safety clutch mechanism which may be interposed in the power transmission system between the box-making machine and my shook selector and illustrating the manner in which the shook-selecting mechanism is disconnected from the box-making machine upon any jamming of the shook-selecting machine to prevent crushing of the shook or heads therein; and Fig. 24 is a vertical sectional view of the clutch mechanism illustrated in Fig. 23, taken along line XXIV—XXIV of Fig. 23.

Referring to the drawings, I have illustrated my shook selecting mechanism as being attached to and associated with a box-making machine particularly adapted for the manufacture of orange boxes or crates, such as are commonly employed in the citrus industry for the packing of oranges. The box-making machine is designated generally by the reference character A and the particular type of box-making machine selected for illustration herein is of the type shown in the George D. Parker Patent No. 982,439, granted January 24, 1911, and which is fully illustrated and described therein. The box-making machine A is adapted to receive certain end and partition boards or heads and to secure to these heads, side and bottom boards or shook for the construction of an orange box or crate. My shook selecting mechanism is illustrated as including a selecting and feeding mechanism B for selecting and feeding the heads for the boxes to the box-making machine A, and also mechanism C for selecting, grouping and arranging the shook for the sides and bottom of the box and delivering these to the box-making machine A in proper relation for the machine A to use the same in the manufacture of boxes.

Box-making machine

Box-making machines of the type illustrated herein have become well known in the art and complete illustration and description thereof is contained in the Parker patent hereinbefore referred to. However, for the more ready understanding of the operation of and advantages of my shook selecting mechanism, a brief description of the box-making machine A is included herein.

The box-making machine A consists essentially of a base or bed-plate 1 from which rises a pair of spaced upright frames 2 and 3. Between the uprights 2 and 3 are three groups of disc clamps 4, each of which is adapted to receive and hold one of the box heads from which the box is to be made, these disc clamps 4 being arranged to rotate the heads through an angle of 90° upon each operation of the nailing mechanism 5 to nail the side and bottom boards upon the heads. Arranged immediately below each of the disc clamps 4 is an anvil 6 upon which the lower edges of the heads may rest to resist the force of the nail driving mechanism 5 during the nailing operations. Arranged immediately below the anvils 6 is an elevator 7 adapted to receive the heads and arranged to be lifted to elevate the heads into their positions between the disc clamps 4. Thus the heads being fed into the machine from the rear thereof (the right-hand side of the machine as viewed in Fig. 1) will pass onto the elevator 7 and when the elevator rises will enter between the disc clamps 4 where they will be gripped and held by the disc clamp during the further operation of the box-making machine until the box is completed.

The nailing mechanism 5 is coupled through connecting rods 8 to cranks 9 on gears 10 (one at each end of the machine), which gears are in turn meshed with pinions 11 on a drive shaft 12 driven by an electric motor D which constitutes the source of operating power for the box-making machine A.

In the manufacture of a box it is necessary to nail the boards constituting one side, then nail the boards constituting the bottom of the box, and then nail the boards constituting the opposite side of the box so that for the manufacture of each box the nailing mechanism 5 must be drawn downwardly and returned to its upper position a total of three times, while at the end of the third nailing operation the box must be removed from the machine and new heads must be inserted in the disc clamps 4 ready for the manufacture of the next box.

The elevator 7 is therefore arranged to be operated only at every third operation of the nailing mechanism 5 by connecting the same (as is fully described and illustrated in the above mentioned Parker patent) to a crank 13 freely rotatable upon the shaft 14 which supports the gears 10 but connectible through a clutch, not shown herein, to the shaft 14 upon each third revolution of the shaft 14.

The boards or shooks to form the sides and bottom of the box are arranged in a hopper 15 at the rear of the machine, this hopper constituting a rack in which a plurality of boards or shooks may be stacked and from which the boards are drawn as they are needed by a pair of shook feeding bars 16 arranged to be reciprocated by means of a pair of levers 17 gears or coupled to the gears 10 so as to reciprocate rearwardly and forwardly upon each operation of the nail driving mechanism 5. The bars 16 are provided with a pair of space fingers 18 and 19 so that upon each forward movement of the feeding bars 16 the lowermost shook in the hopper 15 will be engaged by the fingers 18 and drawn from the hopper, following which, as the fingers 19 are drawn below the hopper 15, the next lowermost shook is drawn therefrom, the two shook so drawn being moved forwardly in the machine until they are positioned directly above the heads (held in the disc clamps 4) in proper spaced relation to be nailed to the heads as the nailing mechanism 5 descends in its next operation.

After one set of shook has been nailed to the heads the mechanism of the box-making machine will cause the disc clamps 4 to rotate through an arc of 90° presenting the next adjacent edge of the heads uppermost, the feed bars 16 will retract, again moving forward and drawing the next two shook from the hopper 15, placing them in position to be nailed to the heads to form the bottom of the box. This operation is repeated a third time, drawing the next two shook from the hopper to form the last side of the box.

By referring particularly to Fig. 2, it will be noted that the orange box includes two end heads $a$ and $b$ constituting the end boards of the box, while a central partition or head $c$ is located at the center of the box to divide the finished box into two separate compartments. The heads $a$, $b$ and $c$ are fed into the disc clamps 4 to present the edges 20 uppermost ready to receive the two boards constituting the first side of the box, which boards are designated $d$ and $e$. As will be understood by those skilled in this art, it is the common practice to print, brand, or otherwise form upon one of the side boards of the box the brand name or other printed matter designating the source from which the products come, or instructions, or other printed matter necessary for the proper identification of, or use of, the package. Ordinarily this printed matter is contained upon the uppermost board or shook constituting the side of the box; that is, upon the shook $d$. The shook are usually branded or imprinted prior to the time they are secured to the heads to form the box, and for this reason it is necessary that the first board drawn from the hopper 15 at the start of the manufacture of a box must be the shook $d$, while the shook $e$, constituting the next board to be drawn from the hopper 15, may be a "blank" shook $e$. After the boards or shook $d$ and $e$ are secured to the heads $a$, $b$ and $c$ the disc clamps 4 rotate to present the edges 21 of the heads uppermost ready to receive the shook constituting the bottom of the box. Again the dimensions of the box may be such that the boards constituting the bottom of the box, namely $f$ and $g$, may be of the same size or width as the shook $d$ or if the width or depth differ from each other it may be desired to employ boards of differing width for the bottom of the box. In any event the next two boards in the hopper 15 must be the bottom shook $f$ and $g$. After the boards $f$ and $g$ are secured to the heads, the heads are again rotated through 90° to present the edges 22 uppermost ready to receive the two shook constituting the last side of the box. Again it is ordinarily desired to have the uppermost board on this side of the box also bear indicia or other printed matter, so the next shook to be drawn from the hopper 15 should be a "blank", said shook $h$, and the last shook to be drawn from the hopper should be a printed shook $k$. The shook $k$ should be arranged in the hopper in such manner that the indicia thereon is upside down with respect to the printed matter on the shook $d$ so that the indicia will read properly when the shook $k$ is secured to the box.

It follows, therefore, that the shook arranged in the hopper 15 must be grouped in groups of six shook for each box, the lowermost shook being the printed or branded shook $d$, the next above should be the blank shook $e$, the next should be one of the bottom boards $f$, the next should be another of the bottom boards $g$, the next should be the blank side shook $h$, and the last should be the branded shook $k$.

Heretofore these shook were arranged in groups of six and placed in the hopper by hand and since six of these must be used for each of the boxes the hopper 15 could contain only a sufficient supply of shook for a relatively small number of boxes without making the hopper 15 so large as to be entirely disproportionate to the machine and to the space required for the location of the machine in the factory. For this reason it was usually necessary either to have a man assigned to the machine in addition to the operator thereof, who would arrange and place the shook in the hopper 15, or it was necessary that the operator of the machine stop the manufacture of boxes therein while he refilled the hopper with properly arranged shooks.

In box-making machines of the character hereinbefore described, three hoppers were arranged at the rear of the machine, each to contain a small supply of heads for the boxes from which three heads were drawn at a time and fed into the machine over the elevator 7. The heads, however, are relatively thick and hence only a small number of these heads could be arranged in the hoppers at one time, again making it necessary that the operator of the machine must either stop the machine to refill the head hoppers, or a man was required in addition to the operator for the purpose of keeping these hoppers full.

As hereinbefore described, my shook selecting mechanism may be employed as an attachment for the box-making machine A and includes a head selecting mechanism B and a side board or shook selecting mechanism C. Both of these mechanisms are mounted upon a suitable stand or table which consists essentially of a pair of side frames each of which is formed of a bottom rail 23, a back leg 24 and a front leg 25 interconnected at their upper ends by means of a longitudinal rail 26. The frames on opposite sides of the machine are interconnected together by means of cross braces 27 and 28 near their lower ends and by means of cross braces 29 interconnecting the front legs 25 about midway of the height of these legs and by a cross brace 30 interconnecting the longitudinal rails 26. If desired, a secondary longitudinal rail 31 may extend between the legs 24 and 25.

*Head selecting and feeding mechanism*

By referring particularly to Figs. 1 and 7 through 10, it will be observed that I have illustrated my head selecting and feeding mechanism which is preferably substituted for the hoppers to the head feeding mechanism previously employed in these box-making machines, though it will be understood by those skilled in this art that my head feeding mechanism may be attached to or associated with the hoppers of the box-making machines to feed heads into the hoppers from which the ordinary head feeding mechanism of box-making machines may select the heads and pass them into the machine as needed.

The head selecting and feeding mechanism of my invention consists essentially in a plurality of hoppers 32, 33 and 34, each arranged to receive a relatively tall stack of heads laid horizontally one upon the other. The hopper 32 is formed preferably of four upstanding corner iron members 35, 36, 37 and 38 arranged at the corners of a rectangle described by the area of one of the heads $a$, $b$ or $c$ to constitute guides for holding a stack of the heads $a$, $b$ or $c$ one upon the other. As will be observed from an inspection of Fig. 1 the hopper 32 extends at a considerable angle to the vertical to adapt it to my head selecting mechanism, though it will be understood by those skilled in this art that the hoppers may be arranged to extend verticaly, if desired. A pair of bottom rails 39 and 40 are disposed immediately below the corner angles 35—36 and 37—38, respectively, to constitute rails upon which the lowermost head will rest and along which this head may be drawn from the stack and passed toward the box-making machine A. The hoppers 32, 33 and 34 are all secured together at their rear ends by means of a plurality of cross straps 41 and at their front ends by a plurality of cross straps 42, the entire assembly being supported upon the frame-work of the machine as by securing the same to the rear legs 24 and 125 and the horizontal bars 26 and 31. The rail 45, on one side of the machine, is connected to a fish plate 46 secured in turn to the bottom rail 23 of that side of the frame of the machine, while the opposite end of the angular rail 45 is secured to a bracket 47 which is in turn secured to the front leg 25 at that side of the machine.

Figure 8:
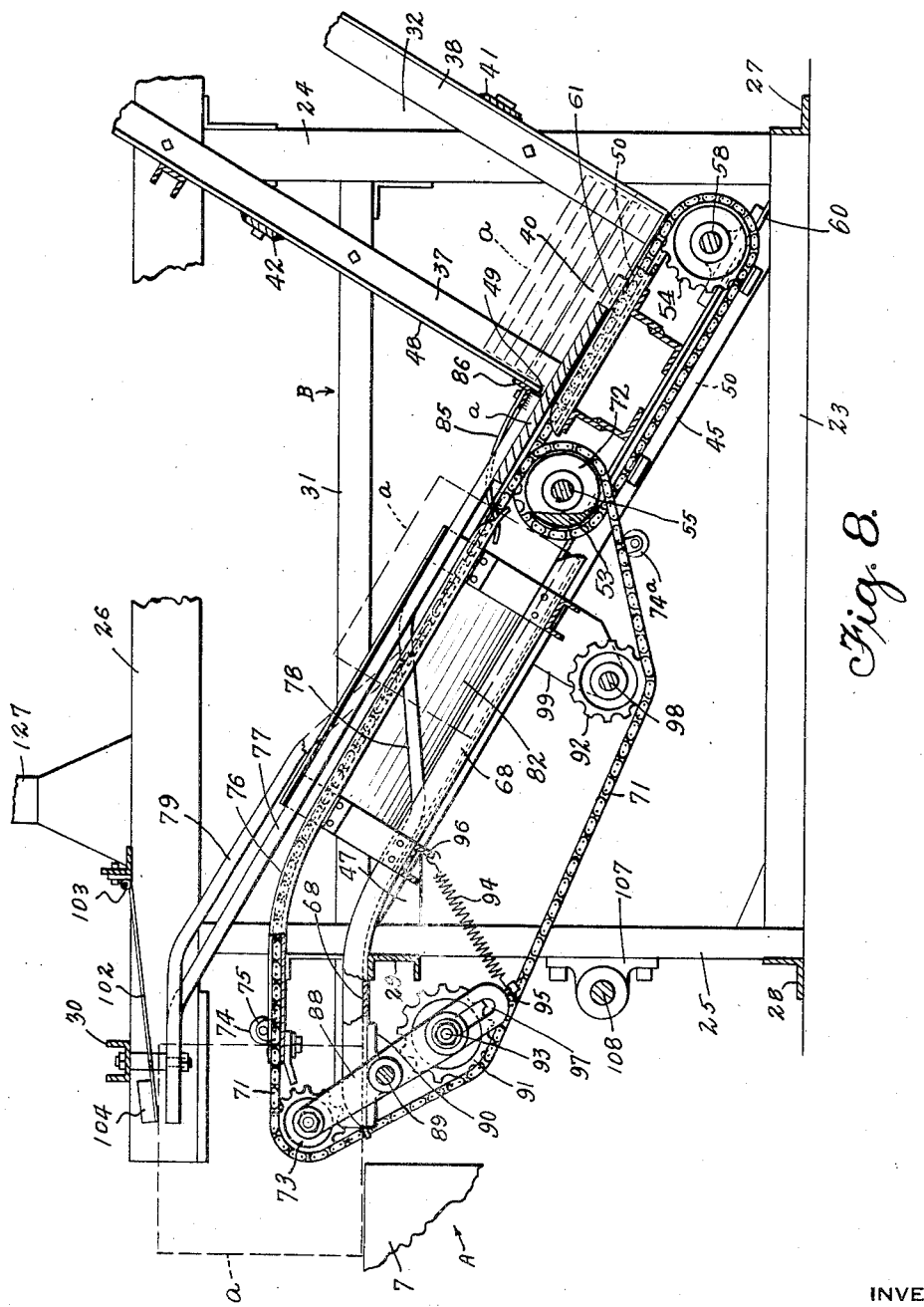
Fig. 8 is a vertical sectional view, taken along line VIII—VIII of Fig. 7.
Figure 9:
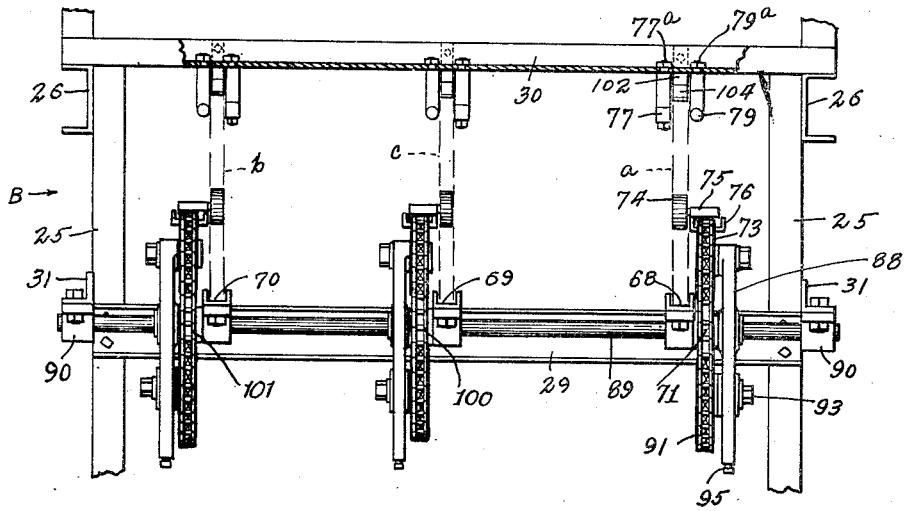
Fig. 9 is an end view, partly in section, taken along line IX—IX of Fig. 7.

By referring particularly to Fig. 8 it will be observed that the front flanges 48 of the corner angles 36 and 37 are cut away near their lower ends as indicated at 49 to form a space above the rails 39 and 40 just a little in excess of the thickness of one of the heads contained within the hoppers so that when a stack of heads is supported by the hopper the lowermost head of the stack may be slid outwardly therefrom through the space or passage formed by the cutaway portion of the corner angles 36 and 37, while the head immediately above the lowermost head will engage the front web of the corner angle and be held thereby until the lowermost head is passed completely out of the stack and the stack is allowed to descend.

By arranging three stacks or hoppers 32, 33 and 34, I provide a separate stack for each of the three heads which are to be employed in the manufacture of an orange box; for example, the hopper 32 may contain all of the heads $a$, another hopper may contain all of the heads $b$, and the hopper 33 may contain all of the center partition heads $c$. I am therefore enabled to draw three heads from the hoppers and feed them toward the box-making machine A by a simple chain conveyer mechanism which will deliver the three heads in proper lateral spaced relation ready to be received by the disc clamps 4 of the box-making machine A.

The head feeding mechanism consists essentially of a head selecting mechanism and a head feeding mechanism. The head selecting mechanism comprises a plurality of endless chains 50, 51 and 52, each disposed immediately below the vertical center of the respective hoppers 32, 33 and 34. The chain 50 extends over a pair of sprockets 53 and 54, the sprocket 53 being rigidly secured to a shaft 55 which extends laterally across the machine between the two side frames thereof, being journaled at its opposite ends in a pair of bearings 56 and 57 secured to the angular rails 45 on opposite sides of the machine. The sprocket 54 is free to turn on a shaft 58 which is rigidly secured by means of bearings 59 and 60 upon the angular rails 45.

By referring particularly to Fig. 8 it will be seen that the upper portion of the path of travel of the chain 50 is disposed immediately below the plane of the rails 39 and 40 and that the chain 50 is provided with a lug 61 which extends upwardly above the chain 50 to engage the lowermost head a in the hopper 32 so that as the sprocket 53 is driven in a counterclockwise direction the lug 61 will be brought into engagement with the rear edge of the head a and will move the same out of the hopper 32.

Figure 7:
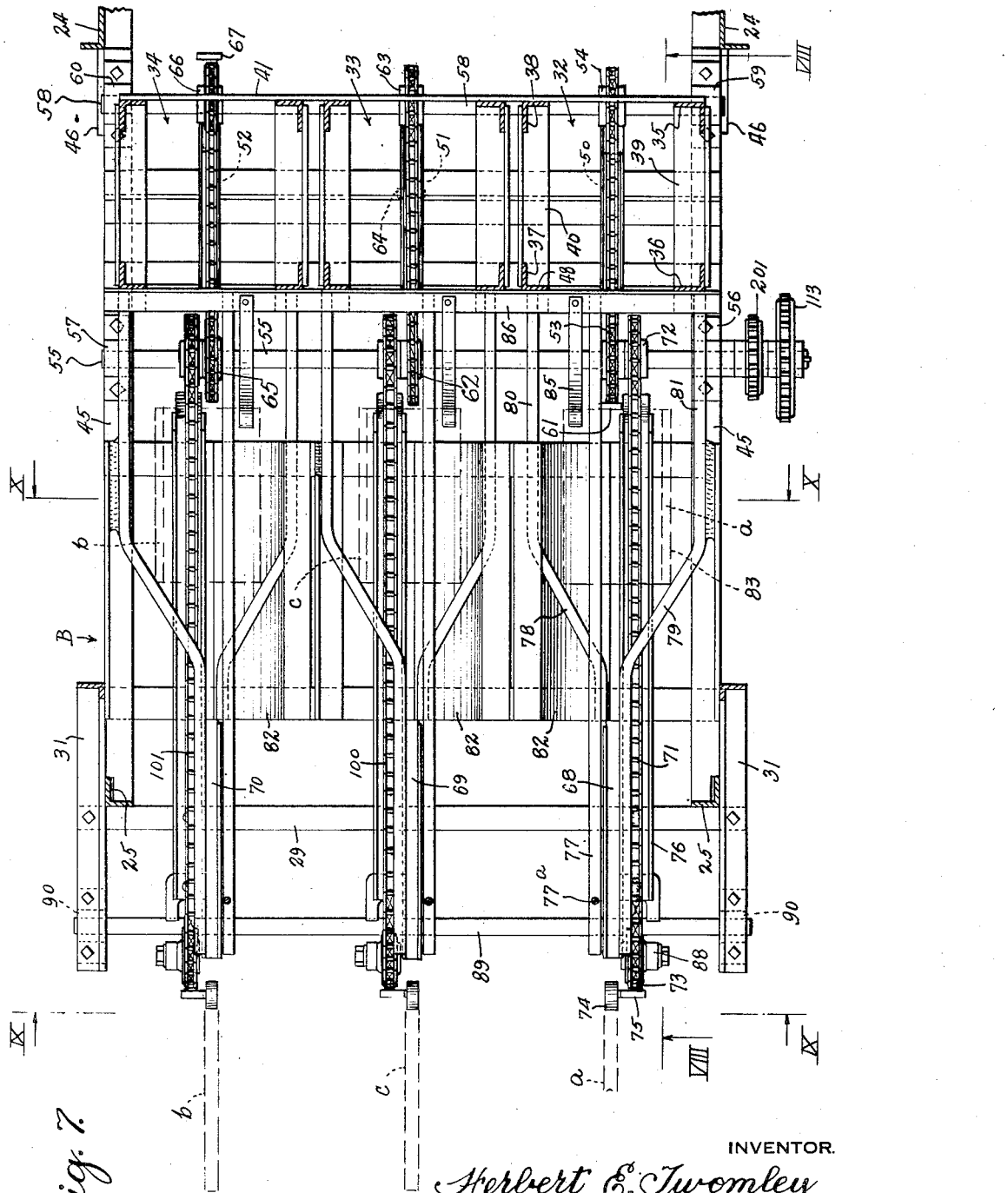
Fig. 7 is a sectional view through my shook selector, taken along line VII—VII of Fig. 1, and illustrating the hoppers in which the heads may be stacked and the mechanism by which the heads are drawn from the stacks and fed into the box-making machine.

Referring to Fig. 7, it will be noted that the chain 51 extends over a pair of sprockets 62 and 63 which, like the sprockets 53 and 54, are secured respectively to the shaft 55 and free to turn on shaft 58 and that the chain 51 is provided with a lug 64 (see Fig. 7) which is adapted to engage the lowermost board or head c in the stack 33 and to move this board out of the hopper 33. It will also be noted that the chain 52 extends over a pair of sprockets 65 and 66 which are likewise secured respectively to the shaft 55 and free to turn on shaft 58 and the chain 52 is provided with a lug 67 adapted to engage the lowermost head b in the hopper 34 to move this head out of the hopper. While the lugs 61, 64 and 67 for the chains 50, 51 and 52 may all be disposed to engage the boards in their respective hoppers at the same time, I prefer to stagger the position of the lugs upon their respective chains in such manner that during one complete travel of the chains 50, 51 and 52 through their paths the lug on chain 51 will engage the head of its hopper 32 and draw this head completely out of the hopper before the lug 64 on the chain 51 engages its head, and similarly that the head should be withdrawn completely from the hopper 33 before the lug on the chain 52 engages the head in hopper 34, thereby requiring that the total amount of power furnished to the shaft 55 need be only such power as is required to draw one head from beneath its stack of heads. This will be appreciated by those skilled in this art when it is noted that a stack of heads for boxes of this character weighs a considerable amount and that when these heads are arranged in a relatively tall stack a considerable force is required to remove the lowermost head from the stack. By staggering the relation of the lugs on the chains 50, 51 and 52 the motive power of the machine is never subjected to a load of more than one stack of heads at a time.

Immediately in front of each of the chains 50, 51 and 52 I provide a semicylindrically shaped track 82 followed by a channel shaped track along which the heads may be drawn as they are fed toward the box-making machine A, the channel shaped track associated with the chain 50 being designated as 68, the channel shaped track for the center partition head being designated as 69 and the channel shaped track for the opposite end head being designated 70. It will be observed that the heads as they are arranged in the hoppers are substantially horizontal, while, when they are fed into the box-making machine A they must stand on edge; that is, they must stand in a vertical plane and for this purpose I provide mechanism for turning the heads after they have been drawn from the stacks. This mechanism includes an endless chain feeding mechanism for each of the sets of heads which will engage the heads and move them toward the box-making machine A, and guide mechanism which will engage the heads as they are moved by rollers on the chains, and turn them until they rest upon one of their edges in the tracks 68, 69 and 70.

Figure 10:
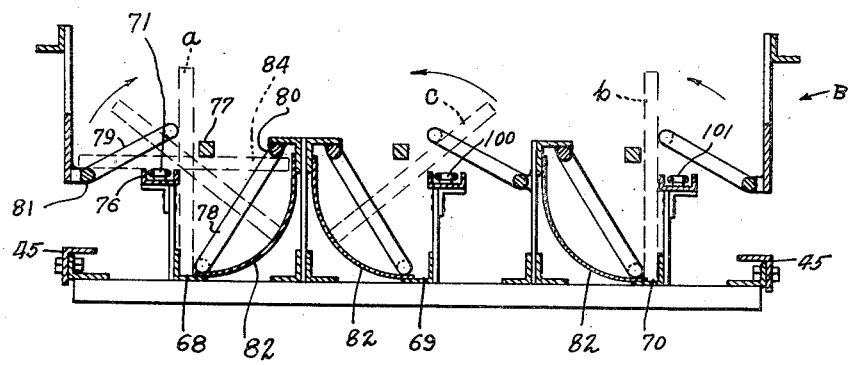
Fig. 10 is a sectional view through the head feeding mechanism, taken along line X—X of Fig. 7.

The feeding and turning mechanism associated with the heads drawn from the stack 32 includes an endless chain 71 trained over a pair of sprockets 72 and 73, the sprocket 72 being rigidly secured upon the same shaft 55 which supports the sprockets 53, 62 and 65 so that power applied to the shaft 55 is transmitted to the chain 71. The chain 71 is disposed in a position slightly offset from the track 68 so that one or more rollers 74, secured to the chain as by means of bearing members 75, project into the space immediately above the semicylindrical track 82 and track 68 to engage boards standing in a leaning position as shown in Fig. 10 in the semicylindrical track 82 and to move them forwardly along the track as the chain moves through its path of travel. I prefer to provide a guide channel 76 (Fig. 10) disposed immediately below the chain 71 to guide this chain during its longitudinal travel along the machine, the guide channel preferably being disposed in a slightly offset relation at one side of the track 68 along which the heads move.

The guide mechanism includes a guide rod 77 which extends longitudinally of the machine in a slightly offset relation to the track 68 but on the opposite side of the track 68 from the chain 71 and its guide channel 76 to provide between the chain channel 76 and the guide 77 a relatively narrow passage through which the boards may be drawn while they are standing on edge. It will be observed that the chain channel 76 and the guide bar 77 are disposed a considerable distance above the level of the track 68 (see Figs. 1 and 8) to engage and support the heads at a considerable distance above their bottom edge.

In order to assist in the turning of the boards from their horizontal position to their vertical position, I provide a pair of turning bars 78 and 79 extending longitudinally of the machine, the turning bar 78 being preferably bent as indicated particularly in Figs. 7 and 8 so that one of its ends 80 is disposed in alignment with one side of the hopper 32 from which point the rod extends forwardly for a short distance and then turns inwardly toward the track 68 and downwardly toward the track 68. In like manner the turning rod 79 has one of its ends 81 disposed in alignment with the opposite side of the hopper 32 and extends forwardly of the machine and inwardly toward the track 68 and upwardly relative to the track 68. The forward ends of the guide rod 77 and the turning rod 79 may be suspended from the cross bar 30 of the frame of the machine, as indicated particularly in Fig. 9, as by securing the same to suitable bolts 77a and 79a respectively secured to the cross bar 30. Extending between the turning rod 78 and the track 68 I provide a curved sheet of material, preferably sheet metal, 82 so that as the heads are drawn from the hopper 32 by the chain 50 the chain 50 will deliver the head to the position indicated at 83 in Fig. 7. At this time the head is disposed immediately above the chain 71 which by reason of the fact that the chain 71 is offset from the center of the heads will allow one side of the head, indicated at 84, (see Fig. 10) to fall downwardly until it engages the curved sheet 82. If desired, this initial turning or twisting of the head may be assisted by providing a spring member 85 attached to a cross rail 86 extending along and engaging all of the forward corner posts of the hoppers, the spring 85 extending forwardly and downwardly so that its outer end will engage the head at a considerable distance away from its point of support upon the channel 76 (Fig. 10).

It will be apparent that when the head is in the position shown at 83 in Fig. 7 the head has been moved forwardly a sufficient distance and also tilted to permit the roller 74 on the chain 71 to engage the rear edge of the head and move it forwardly in the machine. As the head is moved forwardly, the head having been tipped downwardly at one of its sides, will cause that side to engage below the turning rod 78 while the opposite side of the board, having been tipped upwardly, will engage the turning rod 79. Now, as the head board is moved forwardly, the turning rods 78 and 79 will complete the turning operation to place the head in a vertical position in the track 68, and as the chain 71 continues its forward movement of the board it will deliver this board along the track 68 in a vertical position by being shoved along by roller 74 attached to the chain.

By referring to Figs. 1 and 8, it will be observed that the extreme forward end of the track 68 is turned downwardly to form a substantially horizontal section of this track aligned with the upper edge of the elevator 7 of the box-making machine, so that as the head is moved along the track 68 it will be delivered directly above the elevator 7.

It will also be noted that the bearing member 75 for the roller 74 positions the roller 74 a slight distance above the level of the chain 71 so that by positioning the sprocket 73 for the chain 71 immediately at the rear of the elevator 7 the roller 74 as it passes over the sprocket 73 will advance the board into the box-making machine until the front edge of the board abuts the front plate 87 of the box-making machine, which determines the accurate positioning of the head in the box-making machine ready for its elevation to the disc clamps 4.

It will also be seen from Figs. 1 and 8 that the sprocket 73 is rotatably mounted upon one end of a bearing lever 88 which is pivotally mounted upon a shaft 89 supported in bearing brackets 90 secured to the longitudinal rails 31 of the frame of the machine. The chain 71, in addition to passing over the sprockets 72 and 73 also passes over a pair of idler sprockets 91 and 92. The sprocket 91 is rotatably secured, as indicated at 93, upon the bearing lever 88 on the side of the shaft 89 opposite to that upon which the sprocket 73 is mounted so that should there be any variation in the dimensions of the head, or for any reason encounter considerable resistance to its being placed against the front plate 87 of the box-making machine A the bearing lever 88 will rotate about its shaft 89, thereby moving the sprocket 73 a slight distance rearwardly and preventing injury to the machine and preventing crushing of the board. Moreover, in order to insure that the head is delivered to its full forward position in the machine, I prefer to so mount the sprocket 73 that it must yield every time a board is pressed into the box-making machine against the front plate 87. The bearing lever 88 is normally urged in a counter-clockwise direction to dispose the sprocket 73 in its extreme forward position by means of a spring 94, one end of which is secured to the lower end of the bearing lever 88, as indicated at 95, while the opposite end of the spring is secured to some stationary part of the machine, such as a bracket 96 which extends below the track 68 to support the pan sheet 82. If desired, the idler sprocket 91 may be mounted upon the lever 88 by means of a slot 97 in the lever 88 thus permitting the sprocket 91 to be adjustably secured at varying distances from the sprocket 73 to maintain the chain 71 in a desired tensioned relation.

The idler sprocket 92 may be mounted at any suitable point upon the machine and is indicated in Fig. 8 as being secured upon a shaft 98 which is in turn supported by brackets 99 secured to the tracks 68, 69 and 70.

By properly selecting the diameters of the sprockets 72 relative to the sprockets 53 the relative speeds of movement of the chains 71 and 53 may be selected, though I prefer that the speed of the chain 71 shall be such that the roller 74 will make one complete travel through the endless path defined by the chain during two travels of the lug 61 of the chain 50. In this manner a second roller 74a may be provided upon the chain 71 in a position diametrically opposite to the position of the roller 74 so that one complete movement of the chain 71 will serve to feed two heads into the box-making machine A while the shorter chain 50 will make two complete revolutions through its path of travel to draw two boards from the stack 32.

The track 69 for the heads drawn from the stack 33 and its associated head-guiding and turning apparatus is identical with that hereinbefore described with reference to the track 68 for the heads drawn from the hopper 32 with the exception that the chain 100, which constitutes the means for moving the heads from the hopper 33 along the track 69 is disposed upon the opposite side of the track from that on which the chain 71 is disposed with reference to its track so that the heads drawn from the hopper 33 are turned in the reverse direction from those drawn from the hopper 32. Likewise the heads drawn from the hopper 34 will pass along the track 70, being moved therealong by means of a chain 101, again the chain 101 being disposed on the side of its track 70 opposite to the arrangement of the chain 71 and its track 68.

As hereinbefore described, the staggering of the lugs 61, 64 and 67 on the chains 50, 51 and 52 allows heads to be drawn from the hoppers 32, 33 and 34 consecutively. However, all three of the heads should be passed into the box-making machine simultaneously, and for this purpose I secure the rollers 74 on all of the chains 71, 100, 101 in alignment with each other so that during the normal operation of the machine the chain 51 will first draw a head from the hopper 32 and deliver the same immediately above the chain 71 a considerable time prior to the time at which the roller 74 (or 74a) arrives in a position to engage this head. Immediately following this operation a head is drawn by the chain 51 from the hopper 33 and delivered immediately above the chain 100, again a considerable period of time in advance of the engagement of the roller 74 (or 74a) on this chain with the head so drawn. Immediately following this operation a head is drawn by the chain 52 from the hopper 34 and delivered immediately above the chain 101, and this should occur just immediately before all of the rollers 74 (or 74a) in the movements of the chains 68, 100, 101 engage the boards which have been delivered over the respective chains. Therefore the movement of the chains 68, 100, 101 will simultaneously move the three heads along their tracks 68, 69 and 70, turning the heads as they move along the tracks and delivering them simultaneously above the elevator 7 of the box-making machine.

During the delivery of one set of heads along the track 68, 69 and 70 the opposed rollers 74a of the chains 71, 100, 101 will return along the lower portion of the chain and during this return movement the chains 50, 51 and 52 will have an opportunity to consecutively draw three more heads from the stacks 32, 33 and 34, and deliver them ready to be picked up by these returning rollers.

Since the most economical space arrangement of the hoppers 32, 33, and 34 on my machine is at a considerable angle to the vertical, the tracks 68, 69 and 70 should also extend at a considerable angle to the horizontal and yet the heads when delivered to the box-making machine A should be traveling along a horizontal path. The mere bending downwardly of the tracks, as indicated in Fig. 8, will permit the heads to assume a truly vertical position and to assist or insure that the heads will be so positioned I prefer to provide a drag 102 above each of the tracks 68, 69 and 70, which drags may consist of a strip of metal hinged as at 103 to an angle-iron extending between the main longitudinal rails 26 of the frame of the machine, the drags 102 extending forwardly over the tracks 68, 69 and 70 and having a weight 104 secured thereto to exert a downward force on the heads as they pass into the horizontal section of the tracks. Since the feeding of the heads into the box-making machine A must coordinate with the operations of the box-making machine, I prefer to drive the chains 71, 100, 101 and the chains 50, 51 and 52 directly from the box-making machine A.

As will be understood by those skilled in the art, and particularly by reference to the George D. Parker patent hereinbefore referred to, box-making machines of the character illustrated herein have previously been provided with feeding mechanisms for drawing heads from the hoppers disposed on the box-making machine and feeding them into the box-making machine in proper timed relation with the operations of the machine, such mechanisms including arms which were supported upon a shaft 105 extending across the back of the box-making machine near the base thereof, (see Fig. 1). When my shook selecting mechanism is substituted for this head feeding mechanism, the shaft 105 and its associated mechanism is removed from the box-making machine and the bearing members upon which the shaft 105 had been mounted may be conveniently employed as a link mechanism by which the frame of my shook selector may be coupled to the box-making machine A as by providing a forwardly projecting bearing bracket 106 on the leg 25 of the frame of the machine which projects forwardly a sufficient distance to permit a rod or shaft 105 to be inserted through the bearing members 106 and the bearing members on the box-making machine which had previously supported this shaft.

Mounted upon the front legs 25 of the frame of the machine are a pair of bearing members 107 (see Fig. 8) through which extends a shaft 108 upon the outer end of which is rotatably mounted a gear 109 coupled by suitable safety clutch mechanism 110 (more fully illustrated in Figs. 23 and 24 and more fully described hereinafter) to a drive sprocket 111. A chain 112 interconnects the sprocket 111 and a drive sprocket 113 secured upon the outer end of the shaft 55.

The gear 109 is meshed with the main drive pinion 11 of the box-making machine A and by suitably selecting the ratio between the pinion 11 and the gear 109, the shaft 55 and the head selecting and feeding chains of my shook selecting machine may be driven in the proper timed relation to deliver the heads to the machine in proper timed sequence with the operations of the box-making machine A. The relations between the various sprockets and their chains is diagrammatically illustrated in Figs. 4 and 5.

*Side and bottom shook selecting mechanism*

The shook selecting mechanism which I have devised for properly selecting and arranging the boards employed for the sides and bottoms of the boxes with the boards arranged in groups of six in proper relation to be fed into the box-making machine in the correct order, is illustrated particularly in Figs. 1 and 11 through 22, and includes a series of stacks or hoppers 120, 121, 122, 123, 124 and 125, one of these hoppers for each of the separate boards employed in the construction of a single box. These hoppers are arranged in and suspended from a suitable supporting framework comprising two side frames including a pair of upright legs 126 and 127 secured to and extending above the horizontal rail 26 of the main frame of the machine on each side of the machine and interconnected at their upper ends by means of a top rail 128 from which is suspended a plurality of rods 129. Wrapped about each of the rods 129 on one of the sides of the machine and about the corresponding rod on the opposite side of the machine is preferably a sheet of relatively thin metal 130 constituting a partition defining the space between the adjacent hoppers 120, 121, etc. The lower ends of the rods 129 terminate in foot-pieces 131, one for each of the rods, the foot-pieces 131 on one side of the machine being all connected together by a strap 132, (see Figs. 18 and 20).

In each of the hoppers 120, 121, etc., may be placed a stack of shook or boards, the boards arranged in the stack 120 being preferably a supply of the branded or printed boards $d$ constituting the first board to be fed into the box-making machine to form the upper part of the first side of the box while in stack 121 I arrange a second supply of boards preferably the boards $e$, to form the lower half of the first side of the box. In stacks 122 and 123 I arrange a supply of the boards $f$ and $g$, respectively, to form the bottom of the box and in the hoppers 124 and 125 I arrange a supply of side boards $h$ and $k$, respectively, care being taken during the placing of the boards in the hoppers 120 and 125 to reverse the printed matter thereon so that this printed matter will be properly arranged in the finished box when the boards are selected and passed to the box-making machine as hereinafter described.

Each of the hoppers and the mechanism associated therewith is a substantial duplicate of the other and a detail description of one will suffice as a description for all of them. By referring to Figs. 18 and 20 it will be noted that the hopper 120, for example, includes a cross strap 133 extending laterally across the machine and having its ends connected as by screws 134 to the foot pieces 131 on opposite sides of the machine. Depending from the cross strap 133 at one side of the machine but spaced inwardly of the foot piece 131 is a shook rest 135, preferably formed of an angular section of relatively heavy metal, the vertical leg of which is secured as by screws 136 to the cross strap 133 while the horizontal leg extends forwardly below the hopper 121 through a distance at least as great as the width of the shook contained within the hopper. A similar shook rest is provided upon the opposite side of the machine to support the ends of the shook at that side of the machine, each of the shook rests having an upper surface upon which the shook actually contacts shaped in such manner as to reduce friction between the shook and the shook-rest to a minimum. For example this shook rest may be provided with a rounded upper surface or with a wire 137 which extends along the horizontal portion of the shook rest to constitute a relatively narrow or line frictional contact between the shook and the rest thus facilitating the sliding of the shook forwardly from its hopper as the shook selecting or picking mechanism is operated, as will be hereinafter described.

Figure 11:
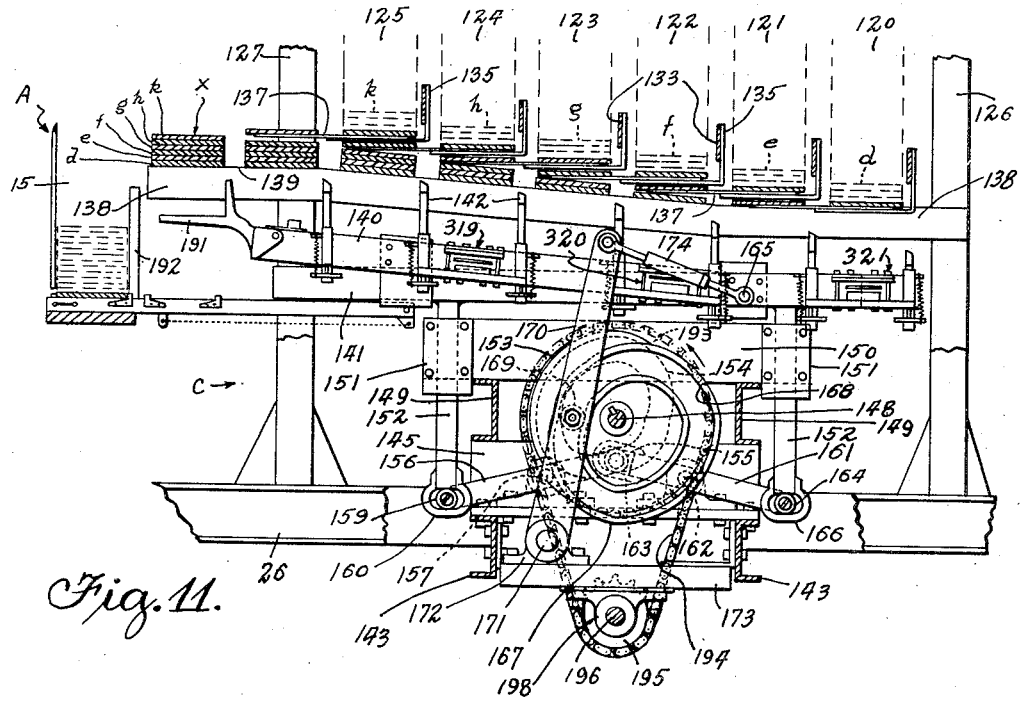
Fig. 11 is an enlarged side elevational view of that portion of my shook selector which selects, arranges and groups the side and bottom shook, and illustrating the position of the operating parts at the beginning of the shook selecting cycle of operations.

Located below, and extending beneath all of the hoppers 120—125, is a pair of tracks 138 one on each side of the machine, these tracks being preferably formed, as shown in Fig. 20, of a section of angle iron spaced inwardly of the machine to present a relatively narrow upper edge 139 below the ends of the shook so that when the shook are withdrawn from their respective stacks they will fall upon and rest upon the tracks 138 and along which the shook may be slid as they are selected and piled one upon the other. It will be noted that the arrangement of the hoppers 120—125 is such that by the employment of a simple shook picking mechanism which will, upon each of its operations, draw one shook from each of the hoppers and move the shook along the tracks 138 to a position immediately below the next adjacent hopper, the first shook drawn from the hopper 120 will be successively moved into position immediately below each of the remaining hoppers and as the shook are drawn from these hoppers they will fall upon and rest upon the shook drawn from the previous hoppers as the shook are advanced along the rails 138 toward the box-making machine A. The shook-picking mechanism comprises a pair of bars 140 and 141 which move shook picks 142 (mounted on the bars 140 and 141) in a substantially rectangular path through a cycle of operations which consists in moving the picks 142 from their normal position, as shown in Fig. 11, directly upwardly to the position shown in Fig. 12, and then moving the picks forwardly to the position shown in Fig. 13, drawing a shook from each of the hoppers and then moving the picks downwardly to the position shown in Fig. 14, disposing the picks below the rails 138 and then moving the picks directly rearwardly back to the position shown in Fig. 11.

The mounting and operating mechanism for the bars 140 and 141 is illustrated as comprising a supporting structure which may be readily constructed of cross tie members 143 (which may be formed of channel iron) connected as indicated at 144 to the horizontal rails 26 of the framework of the machine. Resting upon the cross tie members 143 is a pair of supporting members 145 extending longitudinally of the machine upon which are mounted a pair of bearings 147 for the reception of opposite ends of a power shaft 148. Suitably spaced above the supporting members 145, as by means of channel irons 149, is a pair of guide bearing members 150 also extending longitudinally of the machine but preferably spaced inwardly toward the center of the machine. Upon opposite ends of each of the guide bearing members 150 is a pair of gibs or slide bearing blocks 151 constituting vertical guide bearings in which a pair of vertical legs 152 may reciprocate. The upper ends of the legs 152 are rigidly secured to the bar 141 so that vertical reciprocation of the legs 152 will cause the bar 141 to be moved upwardly and downwardly. To move the bars 141 upwardly at the proper timed interval and downwardly at other properly timed intervals, I provide upon the power shaft 148 a pair of cams 153, one for each of the bars 141. The cam 153 has a cam groove 154 therein in which rides a cam roller 155. The cam groove 154 has a contour such that upon a single revolution of the shaft 148 the cam roller 155 will be moved upwardly and then downwardly through a motion which, as will be hereinafter more fully explained, includes a substantially rapid downward movement, a pause, then a substantially rapid upward movement, and then a second pause. The cam roller 155 is carried upon one end of a lever 156 which is pivoted upon a bearing 157 mounted on a channel iron 158 which extends between the cross members 143, the outer end of the lever 156 having a roller 159 thereon which rides in a yoke 160 secured to the lower end of one of the legs 152 for the bar 141. A second lever 161, pivoted upon a bearing 162 has one of its ends provided with a slotted yoke 163 engaging the roller 155 and carries upon its outer end a roller 164 which operates within a yoke 166 similar to the yoke 160 but attached to the second leg 152 of the bar 141. The cam 153 for the opposite side of the machine is similarly coupled to roller 155a and levers 156a and 161a to the legs 152 for the bar 141 on that side of the machine.

Associated with the cam 153 is a cam 167 which has a cam groove 168 therein engageable with a roller 169 carried upon the mid portion of the lever 170, one end of which lever is pivoted at 171 to a bearing 172 stationarily carried by a channel bar 173 suspended from the cross member 143. The upper end of the lever 170 is connected by means of a link 174 to a pin 165 which is attached to and projects from the bar 140. The contour of the cam groove 168 is such that during one revolution of the shaft 148 the carriage bar 140 will be moved forwardly, then pause, then rearwardly, and pause, and the contours of the cam grooves 154 and 168 are so arranged relative to each other that during the pause of the vertical movement of the bars 141 the horizontal movement of the bars 140 takes place, thus providing, with a single rotation of the shaft 148 a rectilinear movement of the shook picks 142. Associated with the cam 153 on the opposite side of the machine is a cam 167a which is coupled by lever 170a to the carriage rod 140 on that side of the machine.

By referring particularly to Figs. 1 and 11 through 14, it will be observed that each of the carriage bars 140 carries a pick 142 for each of the hoppers 120—125 inclusive, the picks being spaced along the bar 140 by distances substantially equal to the spacing of the hoppers relative to each other. The picks 142 (see Figs. 15, 18 and 20) are slidably mounted in a vertical slide bearing member 175 and are normally urged upwardly in the bearings 175 by means of a spring 176, one end of which is secured to the slide bearing 175 at 177, the opposite end of which is connected at 178 to a foot member 179 threaded upon the lower end of the shook pick 142.

Figure 12:
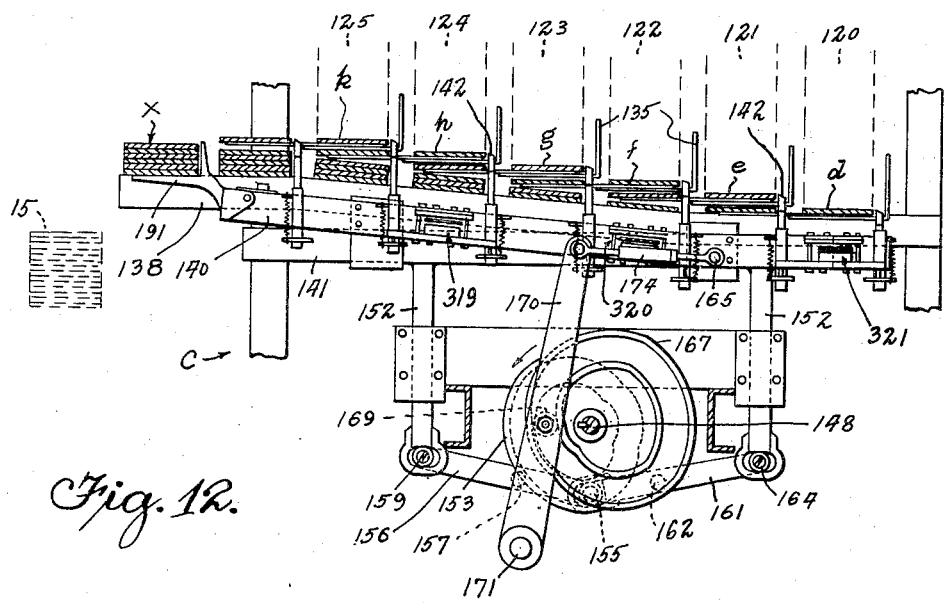
Fig. 12 is a view similar to Fig. 11, and illustrating the position of the shook selecting operating parts at the next step in the cycle of selection of the shook, wherein the selecting fingers are disposed behind the lowermost shook in each of the stacks ready to remove these shook from the stacks.
Figure 13:
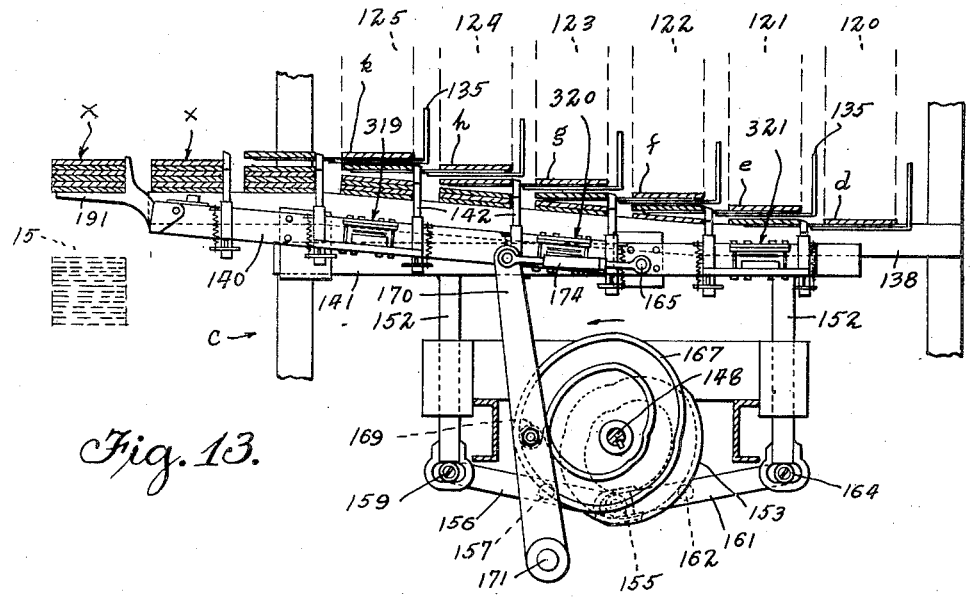
Fig. 13 is a view similar to Fig. 11 and illustrating the operating mechanism at the next position in its cycle of operations after the lowermost shook in each stack has been removed therefrom and disposed immediately below the next adjacent stack.
Figure 14:
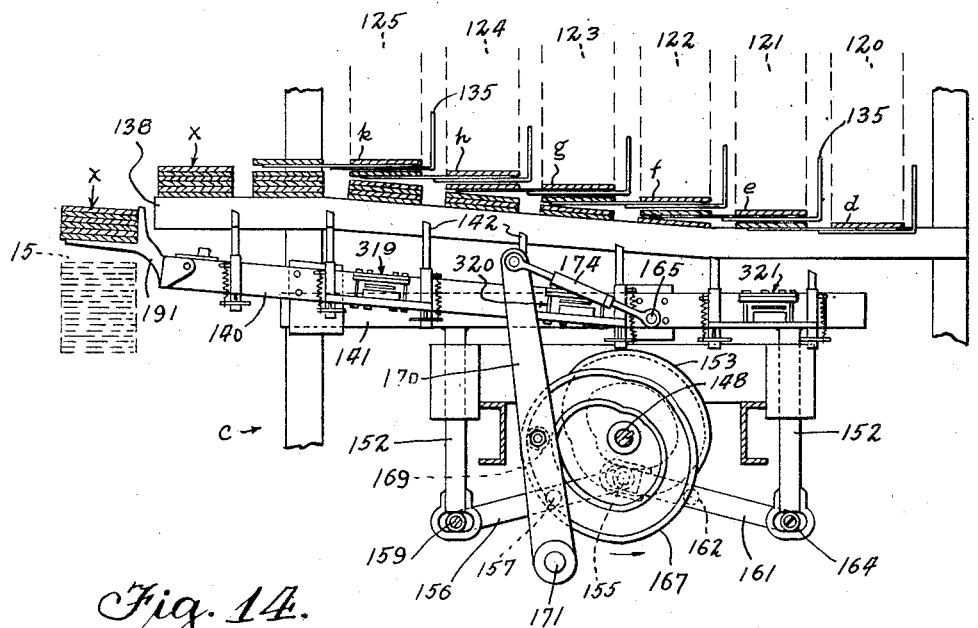
Fig. 14 is a view similar to Fig. 11 illustrating the position of the shook selecting operating parts at the next, or final, step in the cycle, wherein the shook selecting fingers have been retracted or lowered ready for their return to the position shown in Fig. 11.

By referring particularly to Fig. 12 it will be noted that when the carriage bar 140 is in its uppermost position the picks 142 will each be positioned behind the lowermost shook in the hoppers with which the picks are associated and the picks in this position should have their upper ends disposed a little over midway of the thickness of the shook so that upon the next movement of the shook-picking mechanism, namely the forward movement of the carriage bars 140, the picks will draw the lowermost shook from each of the hoppers without engaging the next lowermost shook, intending to draw this shook from the hopper. By the employment of the carriage bars 140 and 141 on opposite sides of the machine, I arrange the picks 142 to simultaneously engage both ends of the shook to slide this shook out of their hoppers without any substantial turning or twisting of the shook as it moves. To insure a snug continuous contact between the picks 142 and the particular shook which is under movement thereby, I prefer to provide a drag upon the shook as it passes out of the hopper, such as that illustrated particularly in Figs. 20 and 22, comprising a finger member 180 insertable in a slot 181 in the foot piece 131 and pivoted as at 182 to the foot piece. The finger 180 has a forwardly projecting lug 183 formed thereon, adapted to engage the lower end of a pin 184 secured in a bore 185 extending vertically through the foot piece 131, the pin 184 being normally urged downwardly against the lug 183 by means of a spring 186 held in the bore 185 by means of a screw plug 187. It will be noted from an inspection of Fig. 22 that the length of the finger 180 is such that it normally projects down toward the shook rest 135 to such position that the space between the shook rest 135 and the lower end of the finger 180 is insufficient to permit the narrowest board or shook to pass therebetween without rocking the finger 180 on its pivot, but due to the yielding mounting of the finger 180 the finger will be rotated partially about its pivot and will act as a drag on the upper surface of the shook which is passing out of its hopper.

In order to prevent the next uppermost shook from passing out of the hopper, due to the friction between this shook and the lowermost shook, I provide a second finger 180a which is mounted and operated by a spring and pin assembly identical with that described for finger 180, similar parts being designated by the same numbers but with the suffix "a" affixed thereto. It will be noted that the length of the finger 180a is slightly less than that of the finger 180 so that this finger will permit the passage of one shook but will resist the passage of two shook at the same time. However, should the lowermost shook in the hopper vary from its intended normal thickness and be so thick as not to pass below the finger 180a, this finger will also yield, allowing such thick shook to pass, but resisting or preventing the passage of the second shook. In other words, the fingers 180 and 181 provide a resistance to the passage of two shook at one time from any of the hoppers but will yield to permit a shook of normal thickness, or even of extraordinary thickness, to pass from the hopper while holding the remainder of the shook therein.

It should also be noted at this point that should the shook become warped and not lie flat upon the shook rest 135 one end of the lowermost shook might be tipped upwardly so as not to freely pass below the fingers 180 or 180a to the shook rest 135 but in this event the yielding of the fingers will permit the proper passage of such warped shook from the hopper. To assist, however, in the accurate movement even of a warped shook, I may provide a spring 190 (see Figs. 20 and 21) near the outer end of the foot piece 131, which spring extends downwardly and forwardly above the shook rest 135, the outer end of the spring 190 tending to urge the shook downwardly upon the rest 135 and its wire 137.

In Figs. 11 through 14 I have illustrated the four positions taken by the carriage bars 140 and 141 and the picks 142 during the four portions of one shook picking cycle. This cycle includes the elevation of the picks 142 from the position shown in Fig. 11 to the position shown in Fig. 12 without any forward movement of the picks. Then the carriage bars 140 are moved forwardly to cause the picks 142 to engage and slide the lowermost shook from the hopper 120 to a position immediately below the hopper 121 while at the same time the lowermost shook from the hoppers 121, 122, 123, 124 and 125 will be moved one step forwardly to position them, respectively, below the hoppers 122, 123, 124 and 125, and to one step forward of 125 on bar 138. The carriage bars 141 are then lowered to retract the picks 142 downwardly below possible engagement with the shook and the carriage bars may then be returned to the position shown in Fig. 11.

The operation of the shook picking mechanism thus far described is as follows: A supply of the proper shook is distributed in the hoppers 120—125 and the machine started in operation as by starting the motor for the box-making machine A. At the start of the operation of the box-making machine A it will be necessary to arrange by hand a plurality of groups of shook and place them into the hopper 15 of the box-making machine A since it will require a number of operations of my shook picking mechanism to select and group a supply of shooks ready for delivery to the hopper 15.

Assuming that the hopper 120 has been filled with a number of shook corresponding to the shook d (see Fig. 2), the hopper 121 being supplied with a number of shook e, hopper 122 with shook f, hopper 123 with shook g, hopper 124 with shook h, and the hopper 125 with shook k, upon each operation of the shook picking mechanism the picks 142, associated with each of the hoppers, will draw the lowermost shook from each of these hoppers and advance that shook one step forwardly. For example, the shook drawn from the hopper 120 will be deposited under the hopper 121, the shook drawn from the hopper 121 will be deposited under the hopper 122, etc. It will be observed, however, that the rod or wire 137 on each of the shook rests extends to a position below the next adjacent hopper so that until the second operation of the shook picking mechanism occurs the shook drawn from the hopper 120 will not be deposited upon the rails 138. However, upon the second operation of the shook picking mechanism all of the shook previously picked from the hoppers will be moved forwardly to their second positions which disposes them beneath the second hopper spaced from that from which they have been picked and at this time the lowermost shook of each group will rest upon the rails 138. It will be noted from an inspection of Figs. 1 and 11 that the height of the shook picks 142 increases progressively as they approach the box-making machine A so that while the pick for hopper 120 is relatively low the pick for hopper 121 extends a sufficient distance upwardly to engage behind the shook which has previously been picked from hopper 120 and also behind the lowermost shook in hopper 121. Thus as the shook are drawn successively from the hoppers they are deposited upon the shook previously drawn from the rear thereof. Thus when the pile of shook arrives at the position indicated at X there is a group of six shook arranged from bottom to top as follows: d, e, f, g, h and k, which is the order in which these shook must be delivered to the hopper 15 of the box-making machine in order that they may be drawn therefrom and fed into the box-making machine as the box is manufactured.

Upon the forward end of each of the carriage bars 140 I provide a delivery fork 191 which moves through the same rectilinear path as the picks 142. Upon each operation of the shook picking mechanism the delivery forks 191 will be moved upwardly to engage the group of shook X and to move them forwardly into the hopper 15.

By referring particularly to Fig. 11 it will be observed that the rear wall 192 of the hopper 15 terminates immediately below the level of the forward end of the rails 138 so that when the delivery fork 191 passes the group of shook into the hopper and then descends (as the shook picking mechanism descends during this cycle of operations), all of the shook in the group X will engage behind the rear wall 192 of the hopper 15 and upon the retraction of the fork 191 the entire group of shook X will be left in the hopper.

The shook picking mechanism is so timed with reference to the operation of the box-making machine A that one complete group of six shook is delivered to the hopper 15 upon each complete cycle of operations of the box-making machine necessary to complete a box. In order to properly time the operation of the shook picking mechanism, I drive the power shaft 148 and the cams 154 by the same motive power means which operate the box-making machine A and the head selecting mechanism B. This may be readily accomplished by mounting a sprocket 193 (see Figs. 4 and 15) on the shaft 148 which is connected by means of a chain 194 to a sprocket 195 on an auxiliary shaft 196 secured in suitable bearings 197 and 198 suspended from the channel members 173. The outer end of the shaft 196 carries a sprocket 199 which is coupled by a chain 200 to a drive sprocket 201 on the shaft 55 previously described with reference to the head selecting mechanism B. This drive sprocket is particularly illustrated in Figs. 4 and 5.

As hereinbefore explained, it frequently occurs that some of the shook may become warped and hence would not lie completely flat in the hoppers 120—125 and upon the upward movement of the shook picking mechanism the picks 142 might not rise sufficiently to engage the tipped-up end of the lowermost shook in the hopper. To prevent the failure of the pick to select and move the lowermost shook from the hopper, I prefer to provide a safety device illustrated particularly in Figs. 18 and 20 which includes a finger 202 formed upon the lower end of a cylindrical body 203 which is arranged to reciprocate in a bore 204 extending vertically in the foot piece 131. The finger 202 preferably projects forwardly from the lower end of the foot piece 131 below the boards or shook arranged in the hopper and to prevent rotation of the body 203 I provide a horizontal pin 205 projecting therethrough and operating in a relatively narrow slot 206 in the foot piece 131. The bore 204 and the slot 206 are arranged to permit a small vertical lifting movement of the finger 202.

The head 207 of the pick 142 has considerable lateral extent, as will be seen in Fig. 20 and is provided in its upper edge with a recess 208 of sufficient width to receive therein the finger 202.

I prefer to arrange the extent of upward movement of the bars 140 and 141 somewhat in excess of that required to actually align the upper end of the picks 142 with the rear edge of the lowermost board in the hopper if this board is flat and lies properly upon the rest 135. Thus when the picks 142 are lifted upwardly they will engage the fingers 202 and lift them. Should one end of one of the shook be warped upwardly the finger 202 will be raised until it contacts the lower surface of the bottom shook in the hopper, the upper edge of the shook pick projecting above the upper surface of the finger 202 a sufficient distance to insure that the pick will engage behind this lowermost shook. If, however, the shook are straight and lie perfectly flat then the lifting of the finger 202 by the pick 142 will raise the lowermost shook. In this way the finger 202 acts as a guide to insure that the pick will extend a proper distance above the lower face of the lowermost shook to engage this lowermost shook and to move it forward without danger of engaging two shook simultaneously or missing one of the shook.

*Synchronizing device*

It will be understood by those skilled in this art that it is necessary that the shook picking mechanism and the head selecting mechanism must operate in absolute synchronism with the operations of the box-making machine A. That is, there is a definite point in the cycle of the operation of the box-making machine A at which the heads must be delivered to the elevator 7 and likewise there must be a delivery of six shook to the machine for every box which is manufactured by the machine. It sometimes occurs, however, that one of the heads or one of the shook become jammed in the shook or head selecting mechanism of the machine and in order to prevent breakage of the machine or crushing of the heads or shook the transmission mechanism employed should yield before such breakage occurs. However, upon the yielding of the transmission mechanism the shook and head selecting devices will then be retarded one step with respect to the operation of the box-making machine A and it is essential that the proper synchronism be restored.

In order to facilitate the yielding of the transmission mechanism upon the jamming of the shook or head selecting mechanism, I prefer to employ the safety clutch 110, illustrated particularly in Figs. 23 and 24, to connect the gear 109 with the sprocket 111 by which motive power is transmitted from the box-making machine A to the head selector and shook selector mechanisms.

As hereinbefore described, the sprocket 111 is rigidly mounted upon the shaft 108, as by securing the same upon a hub 210 of a clutch member 211 which is in turn keyed as at 212 to the shaft 108. The clutch member 211 has a vertical face 213 thereon in which is formed a plurality of substantially conical shaped recesses 214 adapted to receive the rounded ends 215 of a plurality of pins 216. As hereinbefore described the gear 109 is freely rotatable upon the shaft 108 and has a plurality of bores 217 extending therethrough in which the pins 216 slide, the pins being normally urged toward the face 213 of the clutch member 211 by means of a spring collar 218 pressed by a spring 219, one end of which abuts upon a flange 220 of a cuplike housing 221 secured to the rear face of the gear 109.

Figure 4:
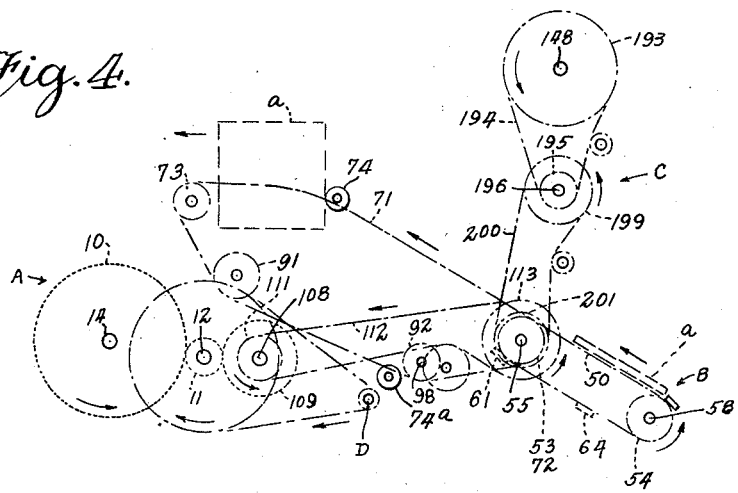
Fig. 4 is a diagrammatic view illustrating the manner in which power is transmitted from the driving motor of the box-making machine to the shook and head selecting mechanisms of my shook selector and illustrating the manner in which my shook selector is coordinated with the operation of the box-making machine.
Figure 5:
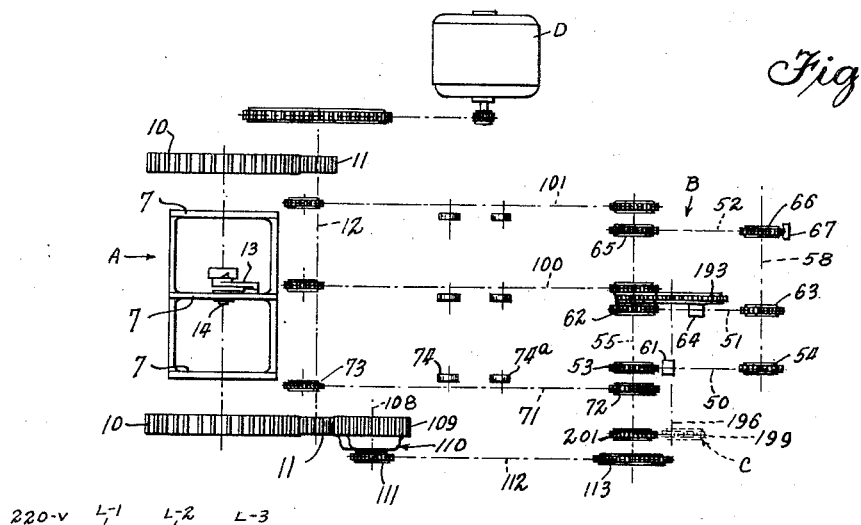
Fig. 5 is a diagrammatic plan view of the power apparatus for operating the box-making machine and illustrating the manner in which said power is supplied from the box-making machine to my shook selector.

The gear 109 is provided with a forwardly projecting flange 222 which nests within a rearwardly extending flange 223 formed upon the clutch member 211. The flange 222 is provided with a socket 224 which receives the rounded end of a pawl 225, the opposite end of which carries a roller 226, the pawl 225 extending at right angles to the axis of rotation of the shaft 108. The periphery of the roller 226 is adapted to seat within a depression 227 in a hard steel block 228 carried by an enlargement 229 of the flange 223 of the clutch member 211. A spring 230, one end of which bears upon the outer end of the pawl 225, normally urges the roller 226 into the depression 227 so that rotation of the gear 109 in a counterclockwise direction, as viewed in Fig. 4, is transmitted to the clutch member 211 only through the engagement of the roller 226 with the block 228. It will be noted that the roller 226 seats in the depression in such manner that the forces transmitted along the axial line 231 tend to move the roller out of the depression but this tendency is resisted by the spring 230. If, however, the resistance to the rotation of the clutch member 211 exceeds the value of the spring 230, the roller will move out of the depression and will roll freely around the interior of the flange 223. Thus the sprocket 111 is connected to the gear 109 only by the roller 226 seating in the block 228 and the total force which can be transmitted from the gear to the sprocket is limited to a predetermined value.

Assuming that during the operation of shook selector and head selecting mechanism some part of the machine should become jammed, the roller 226 would free the shook and head selecting mechanism from the box-making machine. In order now to restore the transmission of power from the box-making machine to the shook and head selecting mechanisms it is necessary to return the roller 226 to a position aligned with the depression 227 in the block 228 which will only occur when the gear and the sprocket are re-aligned in their original positions. As will be hereinafter more fully described, I provide a mechanism for automatically stopping the motor D of the box-making machine if the clutch mechanism 110 becomes disconnected and ordinarily such stopping will occur prior to the time that the gear has made one complete revolution relative to the sprocket 111. It is therefore only necessary to turn the shook and head selecting mechanisms forwardly by hand until the roller 226 re-seats in the block 228 and synchronism of the operations of the machine is restored.

*Safety system*

In order to achieve the automatic stopping of the box-making machine when the shook selector for some reason gets out of order, I prefer to provide a safety system thereon similar to the safety system disclosed in the copending application of John B. Tate, Serial No. 46,685, filed October 25, 1935, for Safety system for box making machines, wherein a control circuit for the driving motor of the box-making machine is automatically interrupted upon the opening of switches controlled by various portions of the box-making machine.

Briefly, the safety system includes a number of switches arranged in series relation and actuated by the failure of some part of the box-making machine to properly perform its functions in the cycle of operations of the box-making machine, an opening of any one of the switches disconnecting the power supplied to the driving motor of the box-making machine.

Figure 6:
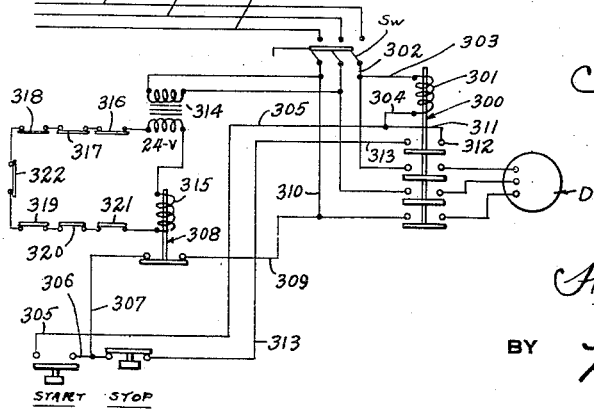
Fig. 6 is a diagrammatic view of a safety circuit which may be employed for the control of the motor for the box-making machine to stop the box-making machine whenever the shook selector fails to properly select the shook.

In Fig. 6 I have illustrated a portion of the safety circuit particularly adapted for my shook selecting and head selecting mechanism illustrated and described herein.

The motor D may be of any suitable type, either operating upon alternating or direct current, though I have illustrated the same in Fig. 6 as being 220 v. alternating current motor, the power lines L—1 L—2, L—3 for which may be any suitable 3-phase alternating current supply. The power lines L—1, L—2 and L—3 extend through a main switch Sw to the contacts of an electromagnetically operated switch or relay 300, such as any of the automatic starters employed in industrial electrical practice. The switch 300 is provided with a coil 301 in circuit with a button bearing the legend "start" by operation of which the coil 301 may be energized; the circuit of which extends from the power line L—1 through switch Sw, conductors 302 and 303 to the coil 301 and thence by way of conductors 304, 305 to the starting button and thence by way of conductors 306 and 307 to the contacts of a safety relay 308 from which the circuit continues by way of conductors 309, 310 back to line conductor L—3. Automatic starters of the character described herein usually have a self-holding circuit for the coil 301 of the switch 300 which circuit extends from the line conductor L—1 through conductors 302 and 303 through the coil 301 and conductor 311 through contacts 312 of the switch 300, which are closed only when the switch contacts are held closed by the coils 301. Thus the circuit continues by way of conductors 313 through the normal closed contacts of a button bearing the legend "stop" and thus by way of conductors 307 309 and 310 to line conductor L—3.

Whenever the stop button is operated the self-holding circuit for the switch 300 is interrupted and the switch opens its contacts. In like manner, whenever the safety switch 308 opens its contacts this self-holding circuit is interrupted and the motor D will be stopped.

As is explained in the copending application of John B. Tate, hereinabove mentioned, the safety relay 308 is preferably of the low voltage type being supplied with current from a low voltage transformer 314 and has its coil 315 in series circuit relation with a plurality of switches 316, 317, 318, 319, 320, 321 and 322 so that upon the opening of any one of these switches the coil 315 is de-energized and the motor D is stopped.

The switch 322 is preferably operated whenever the clutch 110 disengages to disconnect the transmission of power from the gear 109 to the sprocket 111.

By referring particularly to Fig. 23 it will be seen that the switch 322 comprises a pair of contacts 323 and 324 capable of being bridged by a movable contact 325 pivoted at 326 upon a suitable support 327 which also supports the contacts 323 and 324. The support 327 is mounted as by means of screws 328 upon a bracket 329 which is in turn mounted upon the bearing 107 in which the shaft 108 operates. The bridge 325 is normally urged into bridging relation with the contacts 323 and 324 by means of a spring 330. One end of the bridge 325 is disposed immediately at the rear of the collar 218 which holds the pins 216 in the recesses 214 of the clutch member 211 so that whenever the clutch 110 is disengaged (that is, whenever the roller 226 leaves its recess 227 the pins 216 will ride out of their recesses 214 and will press the collar 218 rearwardly, engaging and swinging the bridge 325 out of contacting relation with the contacts 323 and 324 of the switch 322. Thus whenever the clutch mechanism 110 is disengaged the motor circuit is interrupted.

It may occur that one of the shook may not feed properly from its hopper 120—125, and the operation of the machine should be stopped if this occurs and for this purpose I have provided switches 316—321, inclusive associated with the shook picking mechanism in such manner that if a board is not properly picked from its hopper one of these switches will be opened. The switches 316—321 are identical in construction and one of these is illustrated particularly in detail in Figs. 18 and 19.

The switch 321 comprises a base 331 which may be formed of an angular section of metal secured as by means of screws 332 to the carriage bar 140 approximately midway between two adjacent shook picks 142. A pair of contacts 333 and 334 are supported upon the base 331 and insulated therefrom as by means of a pair of strips 335 of insulating material. A bridge 336 is adapted to interconnect the contacts 333 and 334 and is supported upon a pair of pins 337 projecting into a block 338 of insulating material and arranged for vertical movement relative to the block 338 upon a guide screw 339. A spring 340 normally urges the bridge 336 into contacting relation with the contacts 333 and 334. The insulating block 338 which supports the bridge 336 is secured to a bar 341 which is guided upon screws 342 (suspended from the base 331) in such manner as to extend above the foot members 179, one of which is carried by the lower end of each of the picks 142.

Figure 19:
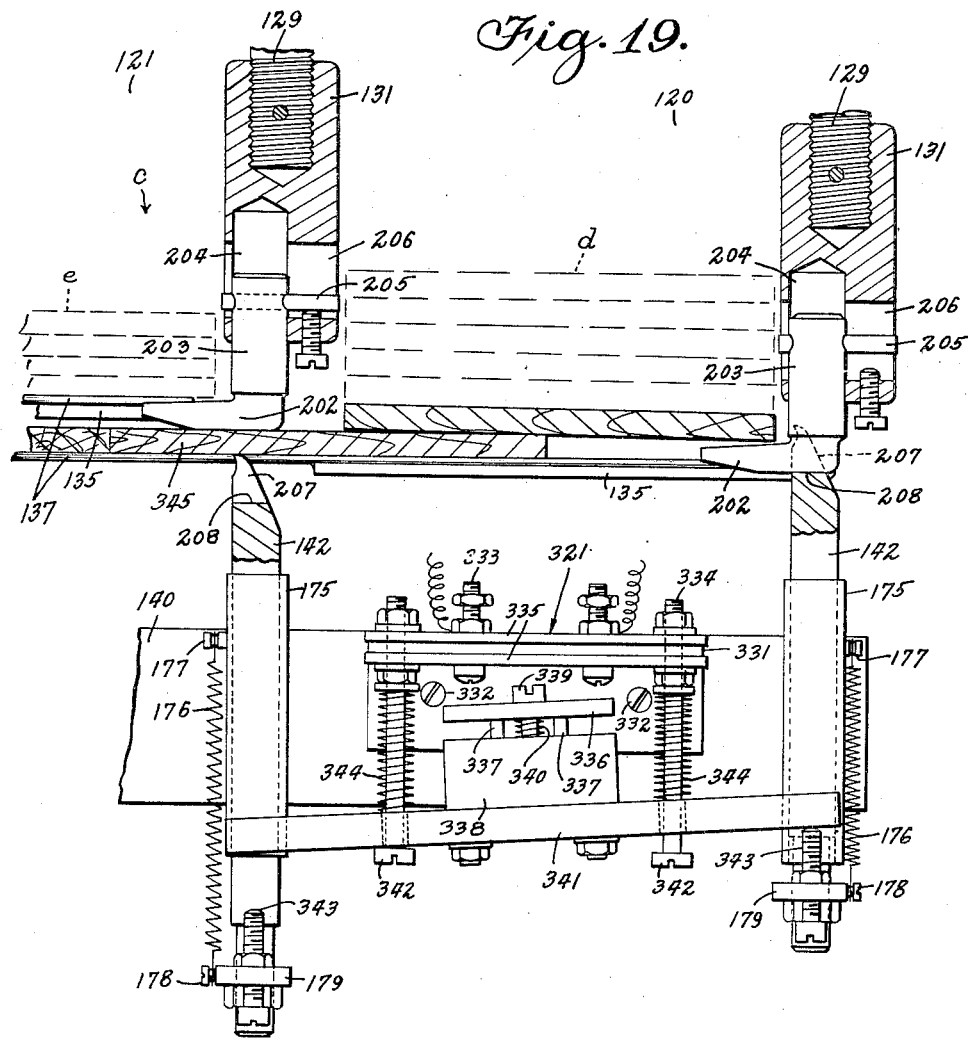
Fig. 19 is a view similar to Fig. 18, illustrating the manner in which the control switch or mechanism is operating upon the failure of the machine to properly select the shook.

An adjusting screw 343 extends through the foot piece 179 and bears upon the lower surface of the bar 341. It will be observed that each of the screws 342 which support the bar 341 is provided with a spring 344 which normally urges the bar 341 downwardly and tends to move the bridge 336 out of contacting relation with its contacts 333 and 334. The engagement of the bar 341 by the screws 343 lifts this bar against the force of the springs 344 and during the normal operation of the nail picking mechanism the nail picks 142 will, when they are raised to their uppermost position, be located behind the lowermost shook in each of the hoppers as indicated in Fig. 18. This condition is illustrated in Fig. 18 wherein the picks have been moved to their proper timing relation relative to the shook in the hoppers 120 and 121 and while there is a slight yielding with the picks 142, due to their engagement with the fingers 202, such yielding is not sufficient to disengage the screws 343 from the bar 341. However if during a previous shook picking operation one of the shook slipped by the pick 142 and was not properly delivered beneath the adjacent hopper, such shook would be in the path of movement of the picks 142 the next time they rise to select the next set of shook. This condition is illustrated in Fig. 19 wherein one of the shook 345 is shown as having been only partially moved in the previous shook picking operation so that upon the next rise of the picks 142 the one pick engages the shook 345 and is prevented from moving to its proper shook-picking position. When this occurs the pick 142 yields (by reason of its spring mounting 176) to move the screw 343 out of engaging relation with the bar 341, while the screw 343 on the other pick 142 (being free to move up to its forward position) bears on one end of the bar 341. This condition will cause the bar 341 to be tipped to such position as will move the bridge 336 out of engaging relation with its contacts 333 and 334.

It will be observed that the screws 342 which support the bar 341 each has a spring 344 which normally urges the bar 341 downwardly, thus normally urging the bridge 336 out of contacting relation. However, the force exerted by these springs 344 is less than the force exerted by the springs 176 on the picks 142, so that the springs 344 are normally compressed and the bridge 336 held against the contacts to close the circuit, as shown in Fig. 18. One of these switches, therefore, will be required for each two picks and in Fig. 6 I have illustrated three switches 316, 317, 318 on one side of the machine, while switches 319, 320 and 321 perform the same service for the six picks on the opposite side of the machine. Hence in the event the shook fails to properly pick, one of the switches 316—321 will be opened to open the circuit to the safety relay 308 and the machine will be stopped.

It will therefore be observed that I have provided a shook and head selecting mechanism which is particularly adapted to be associated with a box-making machine of the character well known in this art, and that the head selecting mechanism and the shook selecting mechanism are so coordinated with the cycle of operations of the box-making machine as to supply the necessary heads and shook to this machine as these heads and shook are consumed by the machine.

While I have shown and described the preferred embodiment of my invention, I do not desire to be limited to any of the details of construction shown herein, except as defined in the appended claims.

I claim:

1. The combination with a machine for making boxes which operates through a cycle of operations to receive heads and shook for a box with the shook grouped in predetermined position different from its position in the assembled box and to secure the shook to the head to form the side walls of the box, of a shook selecting mechanism and a head selecting mechanism including a plurality of head hoppers for holding a supply of heads piled one upon the other, means for drawing the lowermost head from each of said head hoppers and feeding the same to said box-making machine, means for driving said head drawing and feeding means in timed relation with the cycle of said box-making machine to deliver said heads thereto at the start of each box-making cycle, a plurality of shook hoppers, at least one for each different kind of shook used in the box construction, for holding a supply of shook piled one upon the other, and means for selecting shook from each hopper and arranging the same in groups, each group containing the shook required for one box in said predetermined position, and means for driving said selecting means in timed relation with the cycle of box-making machine to deliver a group of shook thereto during each cycle of said machine.

2. The combination with a machine for making boxes which operates through a cycle of operations to receive heads and shook for a box with the shook grouped in predetermined position different from its position in the assembled box and to secure the shook to the head to form the side walls of the box, of a shook selecting mechanism and a head selecting mechanism including a plurality of head hoppers for holding a supply of heads piled one upon the other, means for drawing the lowermost head from each of said head hoppers and feeding the same to said box-making machine, means for driving said head drawing and feeding means in timed relation with the cycle of said box-making machine to deliver said heads thereto at the start of each box-making cycle, a plurality of shook hoppers, at least one for each different kind of shook used in the box construction, for holding a supply of shook piled one upon the other, means for selecting shook from each hopper and arranging the same in groups, each group containing the shook required for one box in said predetermined position, means for driving said selecting means in timed relation with the cycle of box-making machine to deliver a group of shook thereto during each cycle of said machine, power means for operating said box-making machine, and means connecting the driving means of said head selecting mechanism and said shook selecting mechanism directly from said power means.

3. The combination with a machine for making boxes which operates through a cycle of operations to receive heads and to secure shook thereto to form the side walls of the box, of a shook selecting mechanism and a head selecting mechanism including a plurality of head hoppers for holding a supply of heads piled one upon the other, means for drawing the lowermost head from each of said head hoppers and feeding the same to said box-making machine, means for driving said head drawing and feeding means in timed relation with the cycle of said box-making machine to deliver said heads thereto at the start of each box-making cycle, a plurality of shook hoppers, at least one for each different kind of shook used in the box construction, for holding a supply of shook piled one upon the other, means for selecting shook from each hopper and arranging the same in groups, each group containing the shook required for one box, means for driving said selecting means in timed relation with the cycle of box-making machine to deliver a group of shook thereto during each cycle of said machine, power means geared to said box-making machine for driving the same, and means coupling the driving means for the head selecting mechanism and shook selecting mechanism to said power means, including a safety clutch having means thereon for transmitting power only when said box-making machine is in a definite timed relation with the shook selecting and head selecting mechanisms.

4. In a machine for supplying a group of box parts ready for assembly into a box, a head selecting mechanism for selecting a group of heads required for one box including a plurality of hoppers, one for each of the heads required for one box, for holding a supply of heads piled one upon the other, means for drawing the lowermost head from each hopper; shook selecting means including hoppers, one for each different type of shook required for one box to hold a supply of said shook piled one upon the other, means for selecting from said hoppers and grouping one set of shook required for one box in predetermined position in a stack, and means for operating said shook selecting means and said head drawing means in timed relation with each other to simultaneously deliver from said machine a complete set of heads and stack shook required for one box.

5. The combination with a machine for making boxes which operates through a cycle of operations to receive heads and to secure shook thereto to form the side walls of a box, of a head selecting mechanism for supplying heads to said box-making machine at the start of each box making cycle including a hopper for each of the heads employed in the manufacture of one box for holding a supply of heads piled one upon the other, means for withdrawing the lowermost head in each hopper and for feeding the heads so drawn to said box-making machine, said means including means for consecutively drawing one head from each hopper and then simultaneously feeding all of the heads so drawn into said box-making machine.

6. The combination with a machine for making boxes which operates through a cycle of operations to receive heads and to secure shook thereto to form the side walls of a box, of a head selecting mechanism for supplying heads to said box-making machine at the start of each box making cycle including a hopper for each of the heads employed in the manufacture of one box for holding a supply of heads piled one upon the other, means for withdrawing the lowermost head in each hopper and for feeding the heads so drawn to said box-making machine, said means including a chain for each of said hoppers disposed respectively beneath said hoppers, each chain having a dog for engaging the lowermost head and drawing the same from the hopper, means for driving all of said chains in synchronism with each other, the dogs on said chains being disposed in staggered relation with each other to draw one head completely from one of the hoppers prior to the start of drawing a head from another of the hoppers.

7. The combination with a machine for making boxes which operates through a cycle of operations to receive heads and to secure shook thereto to form the side walls of a box, of a head selecting mechanism for supplying heads to said box-making machine at the start of each box making cycle including a hopper for each of the heads employed in the manufacture of one box for holding a supply of heads piled one upon the other, means for withdrawing the lowermost head in each hopper and for feeding the heads so drawn to said box-making machine, said means including a track associated with each of said hoppers and extending to said box-making machine, means for withdrawing the lowermost head from each of said hoppers and delivering the same to said track, means for engaging the heads so drawn and for moving them along said track toward said box-making machine, and means for turning said head into an upright position to dispose said heads on edge upon said tracks prior to delivery thereof to the box-making machine.

8. The combination with a machine for making boxes which operates through a cycle of operations to receive heads and to secure shook thereto to form the side walls of a box, of a head selecting mechanism for supplying heads to said box-making machine at the start of each box making cycle including a hopper for each of the heads employed in the manufacture of one box for holding a supply of heads piled one upon the other, means for withdrawing the lowermost head in each hopper and for feeding the heads so drawn to said box-making machine, said means including a plurality of endless chains, one disposed beneath each of said hoppers, each chain having a dog thereon for engaging the lowermost head in its associated hopper and for moving the same out of said hopper, said dogs on the respective chains being so disposed relative to each other that the dog on one of said chains will draw a head completely from a hopper prior to the drawing of a head from another of the hoppers, and feeding means for engaging the heads so withdrawn for simultaneously moving all of said heads into said box-making machine.

9. The combination with a machine for making boxes which operates through a cycle of operations to receive heads and to secure a shook thereto to form the side walls of a box, of a head selecting mechanism for supplying heads to said box-making machine at the start of each box making cycle including a hopper for each of the heads employed in the manufacture of one box for holding a supply of heads piled one upon the other, means for withdrawing the lowermost head in each hopper and for feeding the heads so drawn to said box-making machine, said means including a plurality of endless chains, one disposed beneath each of said hoppers, each chain having a dog thereon for engaging the lowermost head in its associated hopper and for moving the same out of said hopper, said dogs on the respective chains being so disposed relative to each other that the dog on one of said chains will draw a head completely from a hopper prior to the drawing of a head from another of the hoppers, feeding means for engaging the heads so withdrawn for simultaneously moving all of said heads into said box-making machine, said last named means including an endless chain for each of said hoppers disposed to engage said heads after withdrawal from said hoppers, each of said chains having means thereon for engaging said heads, said engaging means for all of said chains engaging all of the withdrawn heads simultaneously to deliver them simultaneously to said box-making machine.

10. The combination with a machine for making boxes which operates through a cycle of operations to receive heads and to secure shook thereto to form the side walls of the box and including means for predetermining the position of a head prior to the start of the box-making cycle, of a head selecting mechanism including a plurality of hoppers for holding a supply of heads piled one upon the other, means for withdrawing the lowermost head from said hoppers and for feeding the same into said position predetermining means of said box-making machine, including means for moving said heads operating through a path of travel tending to move the head to a position beyond said predetermining means, and means for yieldingly mounting said head moving means to yield when said head reaches the predetermined position in said machine.

11. The combination with a machine for making boxes which operates through a cycle of operations to receive heads and to secure shook thereto to form the side walls of the box and including means for predetermining the position of a head prior to the start of the box-making cycle, of a head selecting mechanism including a plurality of hoppers for holding a supply of heads piled one upon the other, means for withdrawing the lowermost head from said hoppers and for feeding the same into said position predetermining means of said box-making machine, said means including an endless chain having means thereon for engaging a head, means defining a path of travel for said chain tending to urge said head beyond said predetermined position including a lever, a pair of sprockets over which said chain travels mounted in spaced relation on said lever, and means yieldingly mounting said lever to retract one of said sprockets when said head arrives in said predetermined position.

12. A machine for selecting a group of heads required for the construction of a box, including a plurality of hoppers, each for holding a supply of one of the heads required for one box piled one upon the other, and means for drawing the lowermost head from each of said hoppers and for simultaneously delivering a group of heads required for one box, including mechanism for consecutively drawing one head from each of said hoppers, and mechanism for engaging said heads so withdrawn for simultaneously feeding said heads from said machine.

13. A machine for selecting a group of heads required for the construction of a box including a plurality of hoppers, each for holding a supply of one of the heads required for one box, piled one upon the other, means for drawing the lowermost head from each of said hoppers and for simultaneously delivering a group of heads required for one box, including an endless chain for each of said hoppers disposed beneath the associated hopper, a dog on each of said chains disposed in staggered relation to the dogs on the remaining chains, means for driving said chains in unison to consecutively move the lowermost head from each of said hoppers, a second set of chains, one associated with each of said hoppers, for engaging the heads so withdrawn, the second chain for each of said hoppers having means thereon for engaging the heads so withdrawn, said engaging means on each of said second named chain being disposed relative to each other to simultaneously engage the withdrawn heads and to move them in unison.

14. A machine for selecting a group of different shook to be used in the construction of a box and for arranging said shook in a predetermined order ready for the construction of a box, including a hopper for each kind of shook for holding a supply of that kind of shook, said hoppers being disposed one beside the other in a predetermined order, means disposed beneath said hoppers for engaging and moving the lowermost shook from each of said hoppers upon each operation thereof and for disposing the shook so drawn beneath the next adjacent hopper whereby the shook drawn from one of the end hoppers will be consecutively positioned beneath each of the remaining hoppers to receive thereon a shook drawn from each of the remaining hoppers, said withdrawing means including a carriage, means mounting said carriage for vertical reciprocation, a second carriage mounted on said first carriage for horizontal reciprocation, and means for moving said two carriages in predetermined timed relation with each other whereby said second named carriage moves through a rectilinear path of travel.

15. A machine for selecting a group of different shook to be used in the construction of a box and for arranging said shook in a predetermined order ready for the construction of a box, including a hopper for each kind of shook for holding a supply of that kind of shook, said hoppers being arranged one beside the other to hold the different shook in parallel relation with each other, a pair of rails extending below all of said hoppers, one adjacent each end of the hoppers, means disposed beneath said hoppers for engaging and moving the lowermost shook of each of said hoppers and for depositing the same upon said rails immediately below the next adjacent hopper and for advancing the shook deposited on said rail successively beneath each of the next adjacent hoppers whereby said shook will be arranged upon said rail in groups containing a shook from each of said hoppers one piled upon the other in the order of the arrangement of said hoppers relative to each other.

16. The combination with a machine for making boxes which operates through a cycle of operations to receive heads and to secure shook thereto to form the side walls of a box, and including means for holding a supply of shook and for withdrawing said shook in a predetermined order for the manufacture of a box, of a shook selecting mechanism for supplying shook to the holder of said machine in the order in which said shook are drawn from said holder in the manufacture of a box, including a pair of parallel rails spaced from each other by distances less than the length of said shook, a plurality of hoppers disposed above said rails, one hopper for each different kind of shook for holding a supply of that kind of shook, said hoppers being arranged one beside the other in spaced parallel relation to dispose the ends of the shook therein above said rails and means disposed beneath said hoppers for withdrawing the lowermost shook from each of said hoppers and depositing the same upon said rails and for progressively moving the shook so drawn to a position disposed beneath the next adjacent hopper whereby a shook drawn from the end hopper will be progressively positioned beneath each of the remaining hoppers and will receive thereon a shook from each of said remaining hoppers to comprise groups of shook arranged in the order in which they are used in the box-making machine, and means delivering said groups to said shook holder on said box-making machine.

17. A machine for selecting a group of different shook to be used in the construction of a box and for arranging said shook in a predetermined order ready for the construction of a box, including a pair of parallel rails spaced from each other by distances less than the length of said shook, a plurality of hoppers disposed above said rails, one hopper for each different kind of shook for holding a supply of that kind of shook, said hoppers being arranged one beside the other in spaced parallel relation to dispose the ends of the shook therein above said rails, and means disposed beneath said hoppers for withdrawing the lowermost shook from each of said hoppers and depositing the same upon said rails and for progressively moving the shook so drawn to a position disposed beneath the next adjacent hopper whereby a shook drawn from the end hopper will be progressively positioned beneath each of the remaining hoppers and will receive thereon a shook from each of said remaining hoppers, each of said hoppers including a shook rest upon which the lowermost shook is supported and along which said shook is moved as it is withdrawn from said hopper, and means disposed in the path of movement of said shook as it passes from said hopper for engaging the next uppermost shook to prevent the same from movement from said hopper.

18. A machine for selecting a group of different shook to be used in the construction of a box and for arranging said shook in a predetermined order ready for the construction of a box, including a pair of parallel rails spaced from each other by distances less than the length of said shook, a plurality of hoppers disposed above said rails, one hopper for each different kind of shook for holding a supply of that kind of shook, said hoppers being arranged one beside the other in spaced parallel relation to dispose the ends of the shook therein above said rails, means disposed beneath said hoppers for withdrawing the lowermost shook from each of said hoppers and depositing the same upon said rails and for progressively moving the shooks so drawn to a position disposed beneath the next adjacent hopper whereby a shook drawn from the end hopper will be progressively positioned beneath each of the remaining hoppers and will receive thereon a shook from each of said remaining hoppers, each of said hoppers including a shook rest upon which the lowermost shook is supported and along which said shook is moved as it is withdrawn from said hopper, means disposed in the path of movement of said shook for engaging the upper surface thereof and to form an abutment preventing the movement of the next lowermost shook until the lowermost shook has been completely removed from said hopper, said last named means including a finger disposed above said shook rest by a distance substantially equal to the normal thickness of one shook but yieldable upon the passage therebeneath of a shook of abnormal thickness.

19. A machine for selecting a group of different shook to be used in the construction of a box and for arranging said shook in a predetermined order ready for the construction of a box, including a pair of parallel rails spaced from each other by distances less than the length of said shook, a plurality of hoppers disposed above said rails, one hopper for each different kind of shook for holding a supply of that kind of shook, said hoppers being arranged one beside the other in spaced parallel relation to dispose the ends of the shook therein above said rails, means disposed beneath said hoppers for withdrawing the lowermost shook from each of said hoppers and depositing the same upon said rails and for progressively moving the shook so drawn to a position disposed beneath the next adjacent hopper whereby a shook drawn from the end hopper will be progressively positioned beneath each of the remaining hoppers and will receive thereon a shook from each of said remaining hoppers, each of said hoppers including a shook rest upon which the lowermost shook is supported and along which said shook is moved as it is withdrawn from said hopper, said last named means including a pair of fingers one disposed above the shook rest by a distance slightly less than the normal thickness of a shook and the other being disposed above said shook rest by a distance slightly in excess of the normal thickness of the shook, both of said fingers being yieldably mounted whereby a shook of normal thickness will engage and be resisted by one of said fingers and a shook of abnormal thickness will be engaged and resisted by both of said fingers.

20. A machine for selecting a group of different shook to be used in the construction of a box and for arranging said shook in a predetermined order ready for the construction of a box, including a hopper for each kind of shook for holding a supply of that kind of shook, said hoppers being disposed one beside the other in a predetermined order, means disposed beneath said hoppers for engaging and moving the lowermost shook from each of said hoppers upon each operation thereof and for disposing the shook so drawn beneath the next adjacent hopper whereby the shook drawn from one of the hoppers will be consecutively positioned beneath each of the remaining hoppers to receive thereon a shook drawn from each of the remaining hoppers, said withdrawing means including a plurality of sets of picks, one set for each hopper for engaging the lowermost shook in each of said hoppers, and means mounting said picks for movement through a rectilinear path of travel including an upward movement to dispose the picks immediately behind the lowermost shook of their respective hoppers, then a horizontal movement to withdraw said shook from said hoppers, then a downward movement to disengage said picks with said shook, and then a rearward movement to return the picks ready for repetition of said cycle, each of said hoppers including a shook rest for supporting the lowermost shook near each end thereof along which said shook is moved as it is withdrawn from the hopper by said picks, a finger on each of said hoppers extending below said lowermost shook and adapted for vertical reciprocation to lift said shook, said finger disposed in the path of movement of said picks to be engaged and lifted thereby as said picks are raised into engagement with said shook whereby said finger regulates the point on said shook which will be engaged by said pick.

21. A machine for selecting a group of different shook to be used in the construction of a box and for arranging said shook in a predetermined order ready for the construction of a box, including a pair of parallel rails spaced from each other by distances less than the length of said shook, a plurality of hoppers disposed above said rails, one hopper for each different kind of shook for holding a supply of that kind of shook, said hoppers being arranged one beside the other in spaced parallel relation to dispose the ends of the shook therein above said rails, means disposed beneath said hoppers for withdrawing the lowermost shook from each of said hoppers and depositing the same upon said rails and for progressively moving the shooks so drawn to a position disposed beneath the next adjacent hopper whereby a shook drawn from the end hopper will be progressively positioned beneath each of the remaining hoppers and will receive thereon a shook from each of said remaining hoppers, each of said hoppers including a shook rest for supporting the lowermost shook near each end thereof and along which said shook is moved as it is withdrawn from said hopper, and spring means in the path of movement of said shook for engaging the upper surface thereof to hold said shook down upon the said shook rest during its passage from the hopper.

22. A machine for selecting a group of different shook to be used in the construction of a box and for arranging said shook in a predetermined order ready for the construction of a box, including a hopper for each kind of shook for holding a supply of that kind of shook, said hoppers being disposed one beside the other in a predetermined order, means disposed beneath said hoppers for engaging and moving the lowermost shook from each of said hoppers upon each operation thereof and for disposing the shook so drawn beneath the next adjacent hopper, whereby the shook drawn from one of the hoppers will be consecutively positioned beneath each of the remaining hoppers to receive thereon a shook drawn from each of the remaining hoppers, said withdrawing means including a plurality of sets of picks, one set for each hopper for engaging the lowermost shook in each of said hoppers, means mounting said picks for movement through a rectilinear path of travel including an upward movement to dispose the picks immediately behind the lowermost shook of their respective hoppers, then a horizontal movement to withdraw said shook from said hoppers, then a downward movement to disengage said picks with said shook, and then a rearward movement to return the picks ready for repetition of said cycle, and means mounting each of said picks to yield upon engagement with an improperly withdrawn shook, power means for operating said shook-withdrawing means, and means associated with said picks and operable upon the withdrawing thereof for stopping the withdrawing means upon failure of said shook to move to its proper position in the cycle of operations.

23. The combination with a machine for making boxes which operates through a cycle of operations to receive heads and to secure shook thereto to form the side walls of the box, of a shook selecting mechanism and a head selecting mechanism including a plurality of head hoppers for holding a supply of heads piled one upon the other, means for drawing the lowermost head from each of said head hoppers and for feeding the same to said box-making machine, means for driving said head drawing means in timed relation with the cycle of said box-making machine to deliver said heads thereto at the start of each box-making cycle, a plurality of shook hoppers, at least one for each different kind of shook used in the box construction, for holding a supply of shook piled one upon the other, means for selecting shook from each hopper and arranging the same in groups, each group containing the shook required for one box, means for driving said selecting means in time relation with the cycle of box-making machine to deliver a group of shook thereto during each cycle of said machine, power means geared to said box-making machine for driving the same, means coupling the driving means for the head selecting mechanism and shook selecting mechanism to said power means, including a slip clutch having means thereon for transmitting power only when said box-making machine is in a definite timed relation with the shook selecting and head selecting mechanisms, including a pair of clutch elements, means frictionally connecting said clutch elements together in a single position of said elements relative to each other, whereby abnormal resistance in the operation of said shook and head selecting mechanisms will disengage said clutch elements and said elements can be reconnected only by returning said clutch elements to their original relative positions.

24. The combination with a machine for making boxes which operates through a cycle of operations to receive heads and to secure shook thereto to form the side walls of the box, of a shook selecting mechanism and a head selecting mechanism including a plurality of head hoppers for holding a supply of heads piled one upon the other, means for drawing the lowermost head from each of said head hoppers and for feeding the same to said box-making machine, means for driving said head drawing means in timed relation with the cycle of said box-making machine to deliver said heads thereto at the start of each box-making cycle, a plurality of shook hoppers, at least one for each different kind of shook used in the box construction, for holding a supply of shook piled one upon the other, means for selecting shook from each hopper and arranging the same in groups, each group containing the shook required for one box, means for driving said selecting means in timed relation with the cycle of box-making machine to deliver a group of shook thereto during each cycle of said machine, power means geared to said box-making machine for driving the same, means coupling the driving means for head selecting mechanism and shook selecting mechanism to said power means, including a slip clutch having means thereon for transmitting power only when said box-making machine is in a definite timed relation with the shook selecting and head selecting mechanisms, including a pair of clutch elements, means frictionally connecting said clutch elements together in a single position of said elements relative to each other, whereby abnormal resistance in the operation of said shook and head selecting mechanisms will disengage said clutch elements and said elements can be reconnected only by returning said clutch elements to their original relative positions, and means actuated by movement of said clutch elements relative to each other for stopping said power means for said box-making machine.

25. The combination with a machine for making boxes which operates through a cycle of operations to receive heads and to secure shook thereto to form the side walls of the box, of a shook selecting mechanism and a head selecting mechanism including a plurality of head hoppers for holding a supply of heads piled one upon the other, means for drawing the lowermost head from each of said head hoppers and for feeding the same to said box-making machine, means for driving said head drawing means in timed relation with the cycle of said box-making machine to deliver said heads thereto at the start of each box-making cycle, a plurality of shook hoppers, at least one for each different kind of shook used in the box construction, for holding a supply of shook piled one upon the other, means for selecting shook from each hopper and arranging the same in groups, each group containing the shook required for one box, means for driving said selecting means in timed relation with the cycle of the box-making machine to deliver a group of shook thereto during each cycle of said machine, power means geared to said box-making machine for driving the same, means coupling the driving means for head selecting mechanism and shook selecting mechanism to said power means, including a safety clutch having means thereon for transmitting power only when said box-making machine is in a definite timed relation with the shook selecting and head selecting mechanisms, including a pair of clutch elements, means yieldably connecting said clutch elements together in a single position of said elements relative to each other, whereby abnormal resistance in the operation of said shook and head selecting mechanisms will disengage said clutch elements and said elements can be reconnected only by returning said clutch elements to their original relative positions, a collar on said clutch operable from a normal position to an abnormal position upon movement of said clutch elements relative to each other, and means actuated by movement of said collar to said abnormal position for stopping the power means of said box-making machine.

26. The combination with a machine for making boxes which operates through a cycle of operations to receive heads and to secure shook thereto to form the side walls of the box, of a shook selecting mechanism and a head selecting mechanism including a plurality of head hoppers for holding a supply of heads piled one upon the other, means for drawing the lowermost head from each of said head hoppers and for feeding the same to said box-making machine, means for driving said head drawing means in timed relation with the cycle of said box-making machine to deliver said heads thereto at the start of each box-making cycle, a plurality of shook hoppers, at least one for each different kind of shook used in the box construction, for holding a supply of shook piled one upon the other, means for selecting shook from each hopper and arranging the same in groups, each group containing the shook required for one box, means for driving said selecting means in timed relation with the cycle of the box-making machine to deliver a group of shook thereto during each cycle of said machine, electrical power means geared to said box-making machine for driving the same, means coupling the driving means for the head selecting mechanism and shook selecting mechanism to said power means, including a safety clutch having means thereon for transmitting power only when said box-making machine is in a definite timed relation with the shook selecting and head selecting mechanisms, including a pair of clutch elements, means yieldably connecting said clutch elements together in a single position of said elements relative to each other, whereby abnormal resistance in the operation of said shook and head selecting mechanism will disengage said clutch elements and said elements can be reconnected only by returning said clutch elements to their original relative positions, a collar on said clutch operable from a normal position to an abnormal position upon movement of said clutch elements relative to each other, a circuit for said box-making machine, power means, and a switch actuated by movement of said collar to said abnormal position for interrupting the circuit for said power means.

HERBERT E. TWOMLEY.